(12) United States Patent
Hong et al.

(10) Patent No.: US 11,073,721 B2
(45) Date of Patent: Jul. 27, 2021

(54) DISPLAY DEVICE

(71) Applicant: Korea University Research and Business Foundation, Sejong Campus, Sejong-si (KR)

(72) Inventors: Mun Pyo Hong, Seongnam-si (KR); Sang Il Kim, Seongnam-si (KR); Ho Won Yoon, Seoul (KR); Yun Seong Jang, Gunsan-si (KR)

(73) Assignee: Korea University Research and Business Foundation, Sejong Campus, Sejong-si (KR)

( * ) Notice: Subject to any disclaimer, the term of this patent is extended or adjusted under 35 U.S.C. 154(b) by 0 days.

(21) Appl. No.: 16/535,812

(22) Filed: Aug. 8, 2019

(65) Prior Publication Data

US 2019/0361293 A1 Nov. 28, 2019

Related U.S. Application Data

(63) Continuation of application No. PCT/KR2018/001909, filed on Feb. 14, 2018.

(30) Foreign Application Priority Data

Feb. 16, 2017 (KR) .................. 10-2017-0021267
Feb. 9, 2018 (KR) .................. 10-2018-0016059

(51) Int. Cl.
*G09G 3/34* (2006.01)
*G02F 1/1335* (2006.01)
*G02F 1/13357* (2006.01)

(52) U.S. Cl.
CPC ...... *G02F 1/133553* (2013.01); *G02F 1/1336* (2013.01); *G02F 1/133528* (2013.01); *G09G 3/3433* (2013.01)

(58) Field of Classification Search
CPC ............ G02B 26/005; G02B 2207/115; G02B 26/004; G02B 26/023; G02F 1/167; G09G 3/3433
See application file for complete search history.

(56) References Cited

U.S. PATENT DOCUMENTS

2013/0335799 A1* 12/2013 Yoon .................. G02F 1/133553
359/227
2016/0202469 A1* 7/2016 Sampsell .............. G02B 26/02
345/85

FOREIGN PATENT DOCUMENTS

KR 10-2010-0037849 A 4/2010
KR 10-2011-0048379 A 5/2011
(Continued)

OTHER PUBLICATIONS

International Search Report for PCT/KR2018/001909 dated May 17, 2018 [PCT/ISA/210].

*Primary Examiner* — Michael H Caley
*Assistant Examiner* — Mariam Qureshi
(74) *Attorney, Agent, or Firm* — Sughrue Mion, PLLC

(57) ABSTRACT

A display device according to an embodiment of the present invention comprises: a first substrate to which external light is applied; a first and a second control electrode disposed on the first substrate, the second control electrode being spaced apart from the first control electrode; an insulating film disposed on the first and the second control electrode; a first and a second contact electrode formed on the insulation film, wherein the first contact electrode at least partially overlaps the first control electrode, and the second contact electrode is spaced apart from the first contact electrode and at least partially overlaps the second control electrode; a shuttering operation body moving between the first and the second contact electrode so as to transmit or block light; a second substrate opposite to the first substrate; and a quantum dot (Continued)

film disposed on the first or the second substrate and adjusting the wavelength of light passing through the shuttering operation body.

20 Claims, 30 Drawing Sheets

(56) References Cited

FOREIGN PATENT DOCUMENTS

| KR | 10-2012-0045934 A | 5/2012 |
| KR | 10-2012-0127312 A | 11/2012 |
| KR | 10-2012-0133669 A | 12/2012 |
| KR | 10-2013-0140462 A | 12/2013 |
| KR | 10-2014-0129803 A | 11/2014 |
| KR | 10-1682931 B1 | 12/2016 |
| KR | 10-2017-0014755 A | 2/2017 |

* cited by examiner

【Fig. 1】
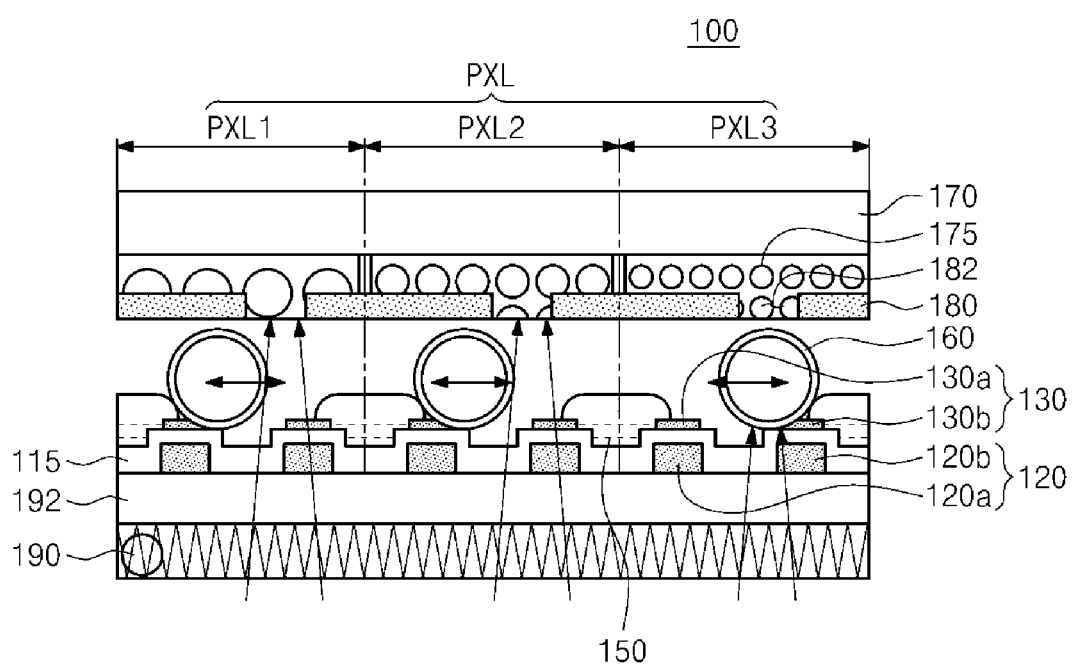

[Fig. 2]
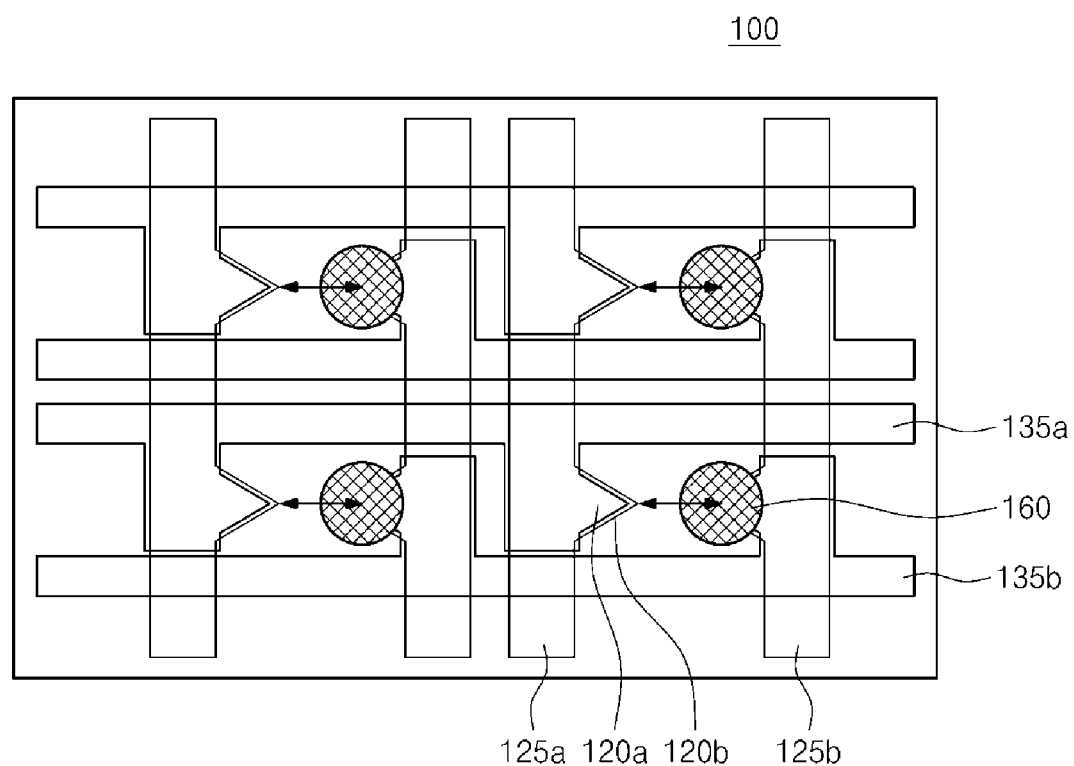

【Fig. 3】
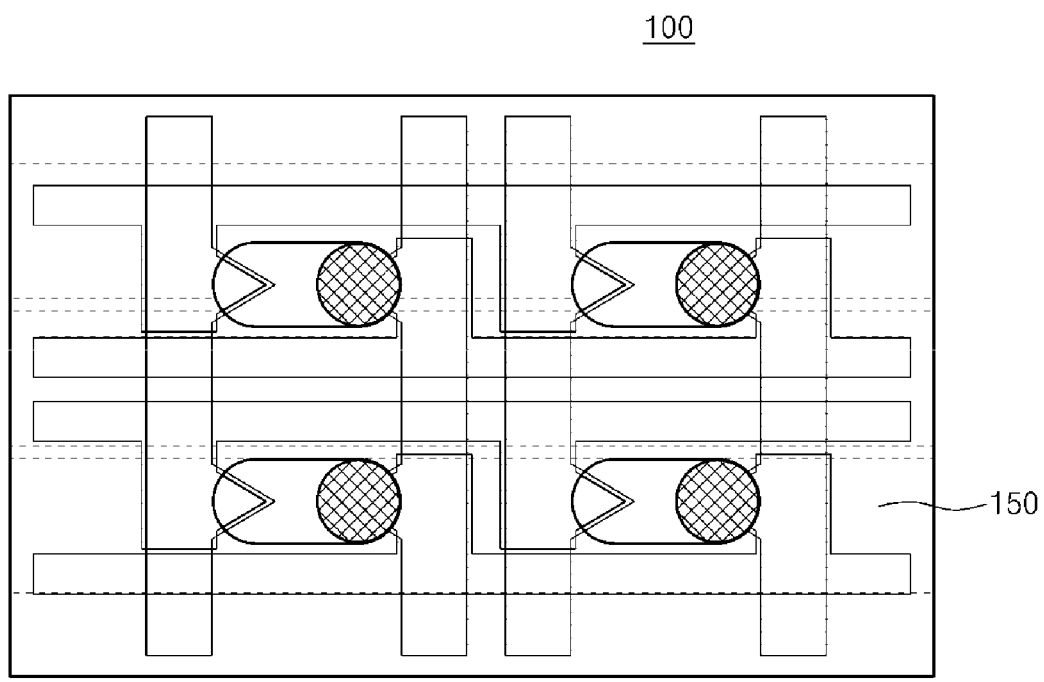

[Fig. 4]
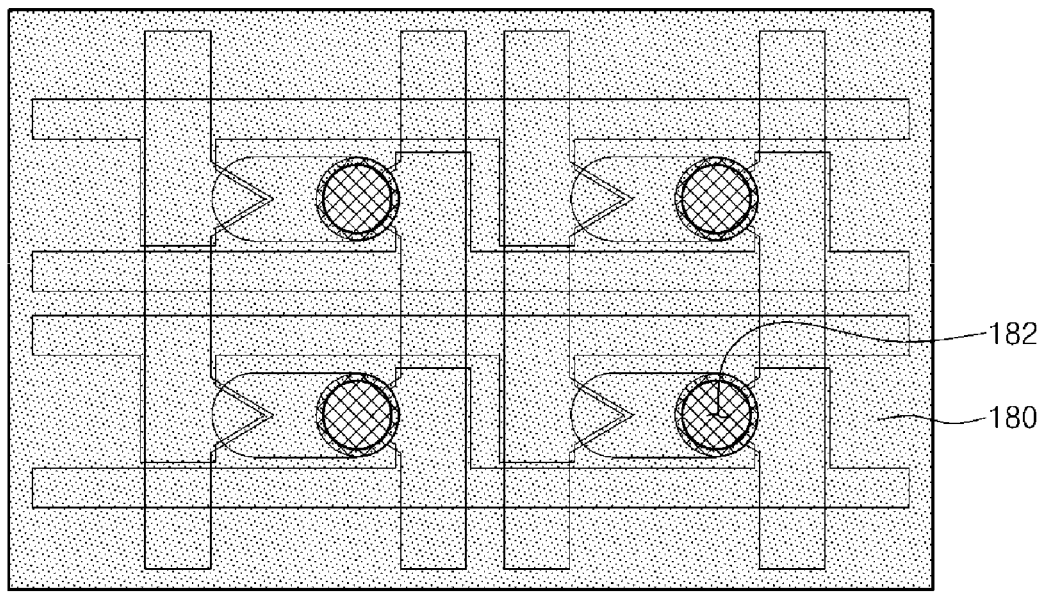

[Fig. 5]
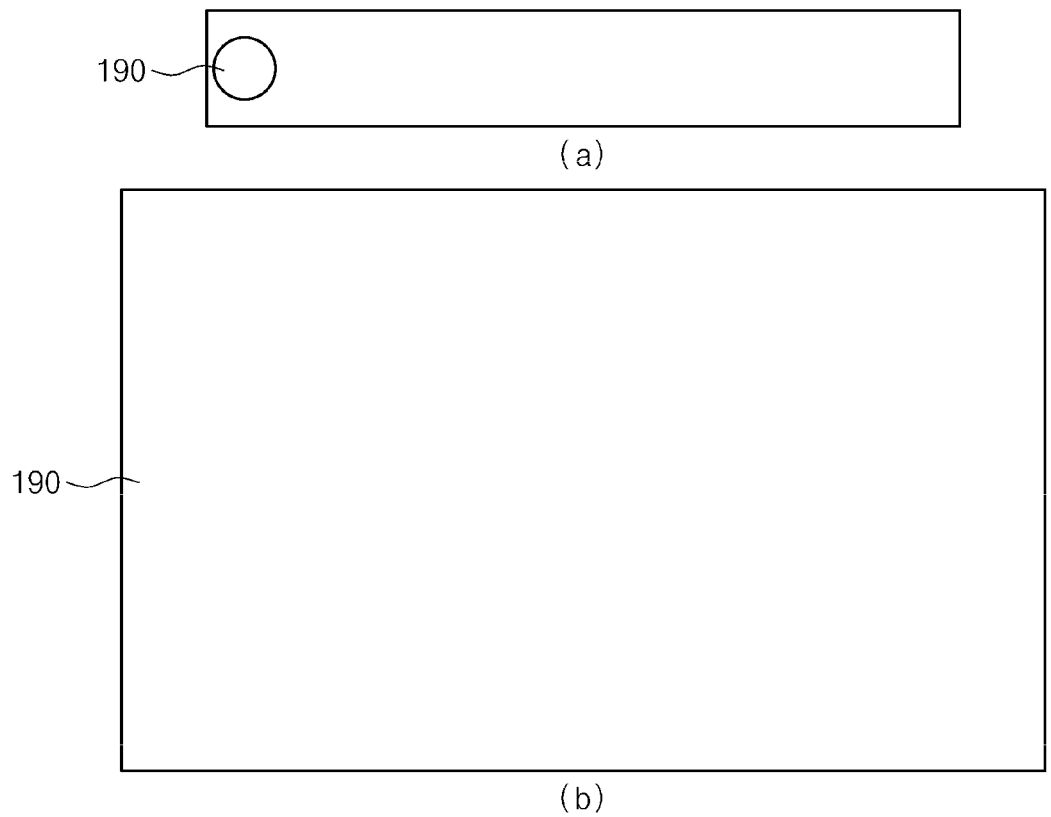

[Fig. 6]
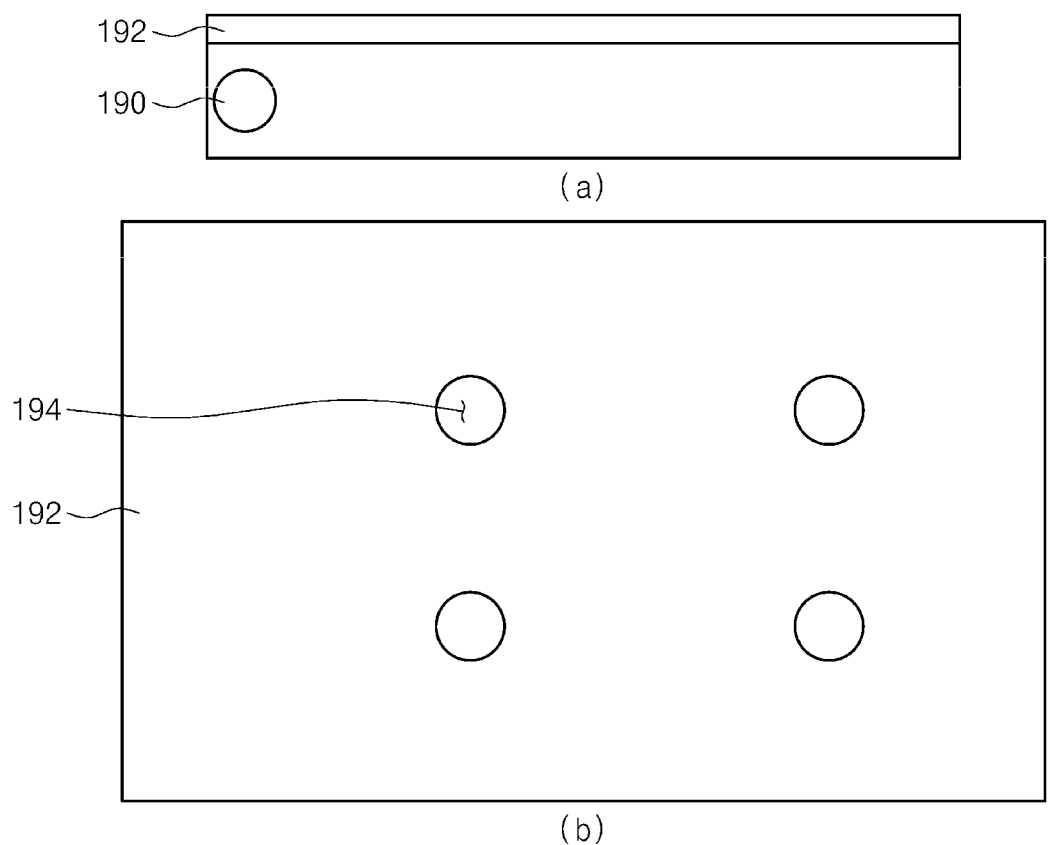

[Fig. 7]
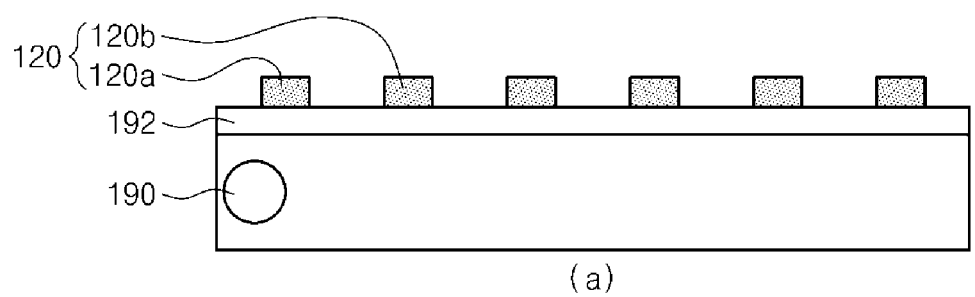
(a)
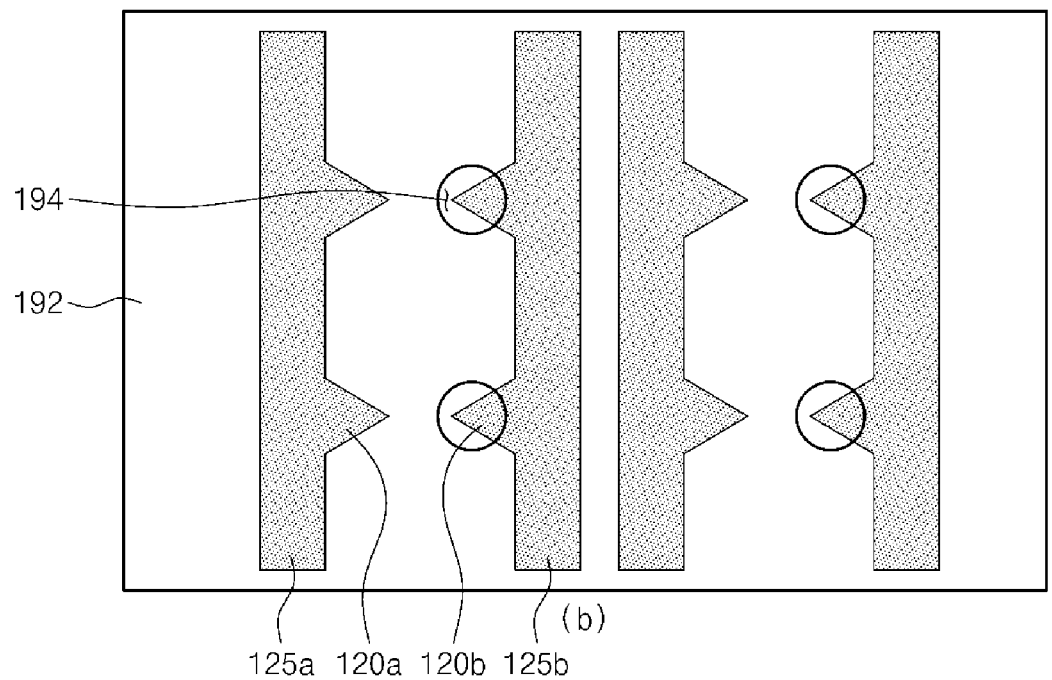
(b)

[Fig. 8]
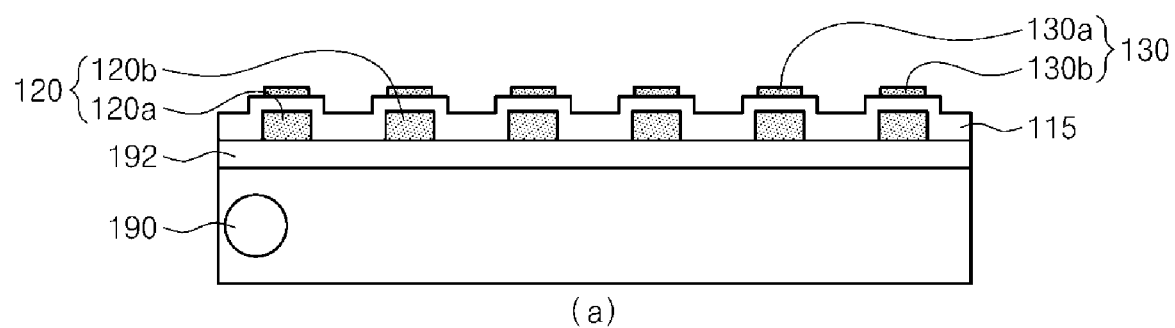
(a)
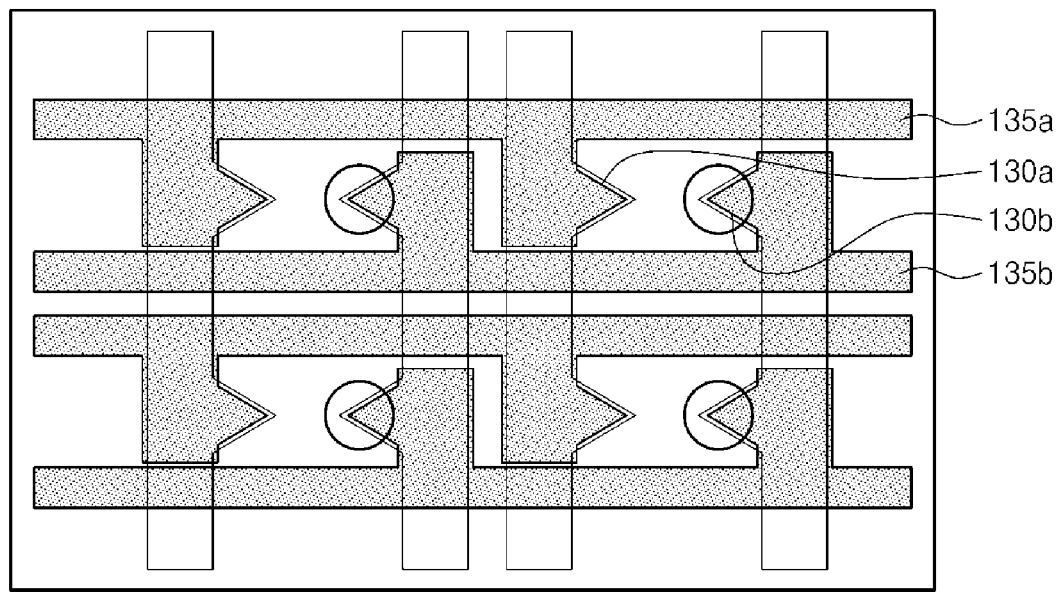
(b)

【Fig. 9】
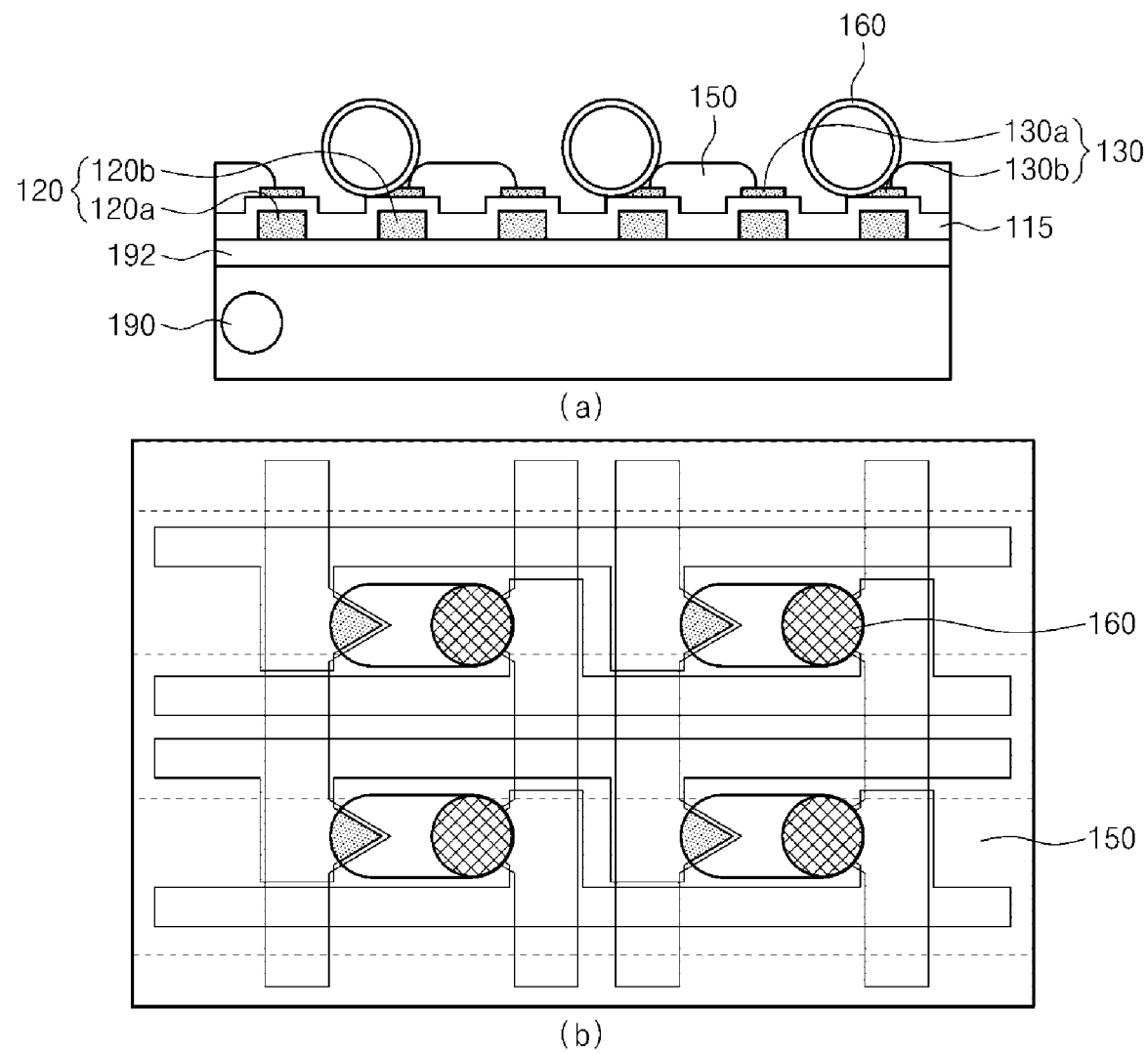

[Fig. 10]
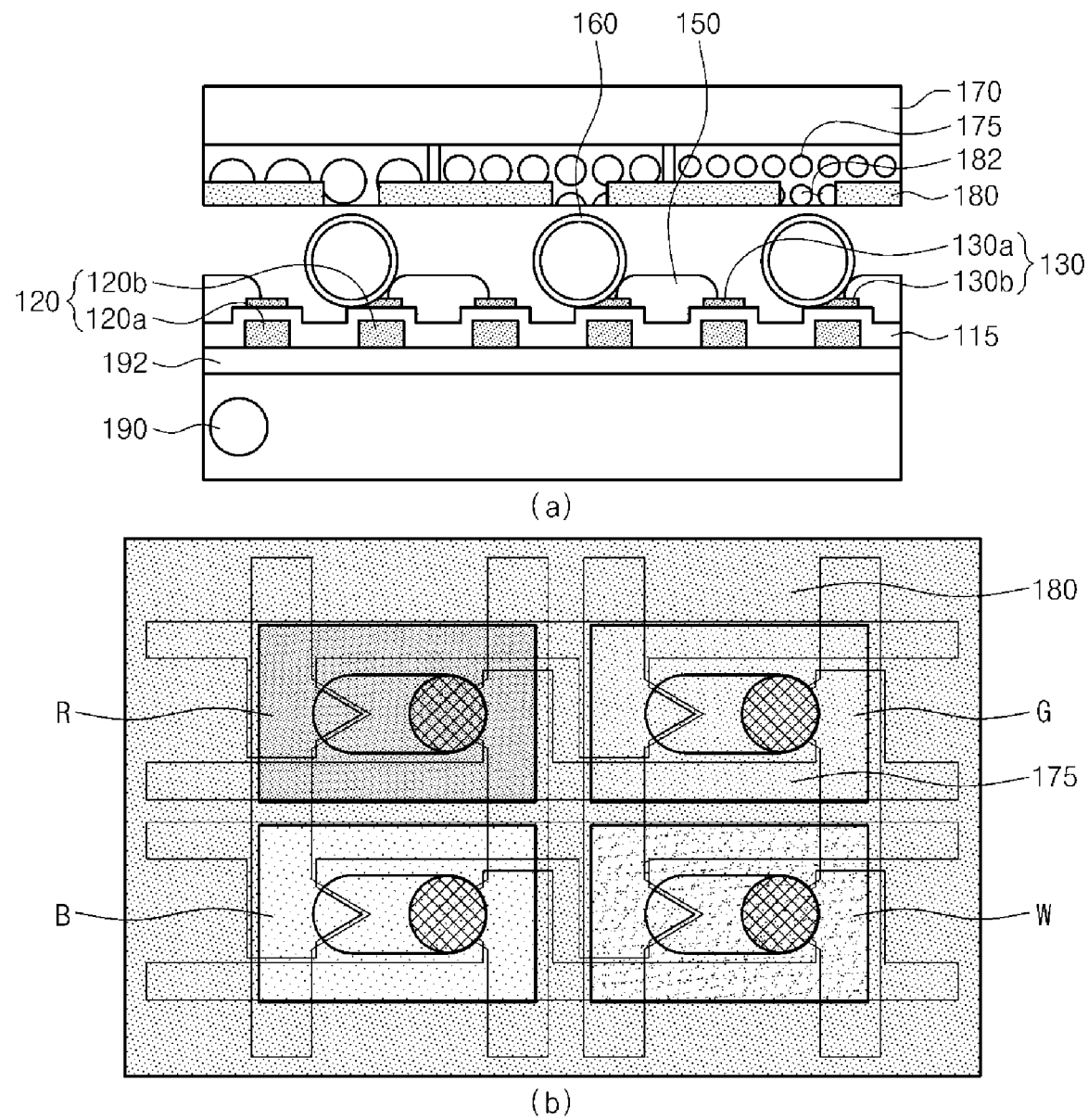

[Fig. 11]
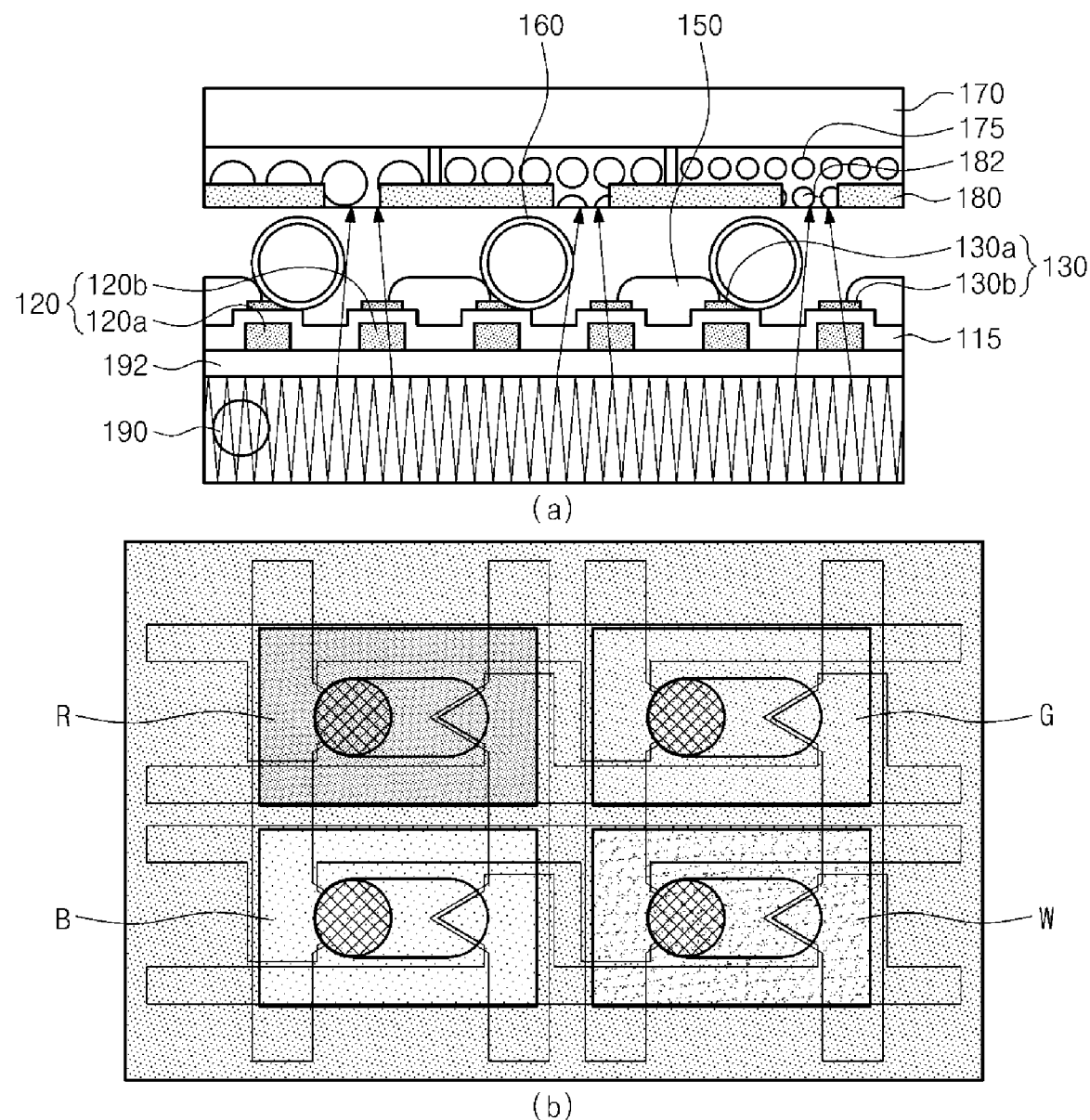

[Fig. 12]
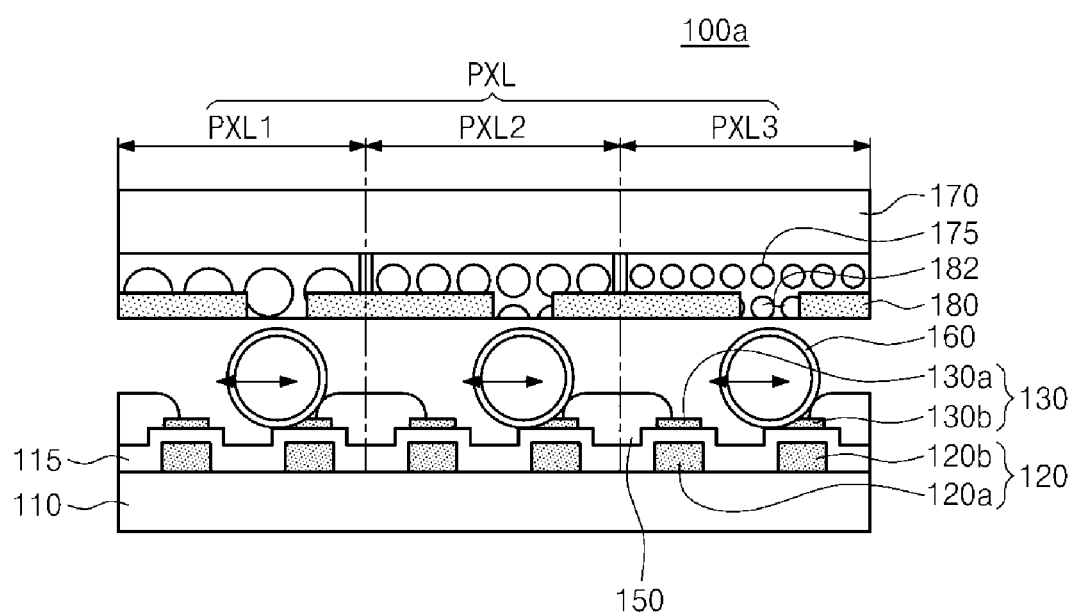

[Fig. 13]
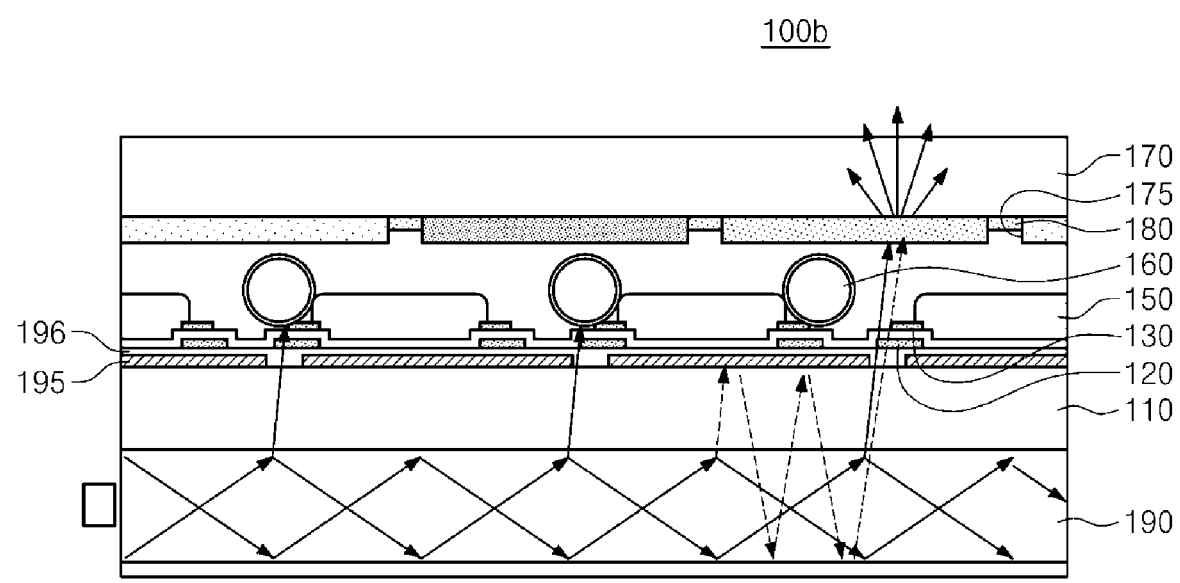

[Fig. 14]
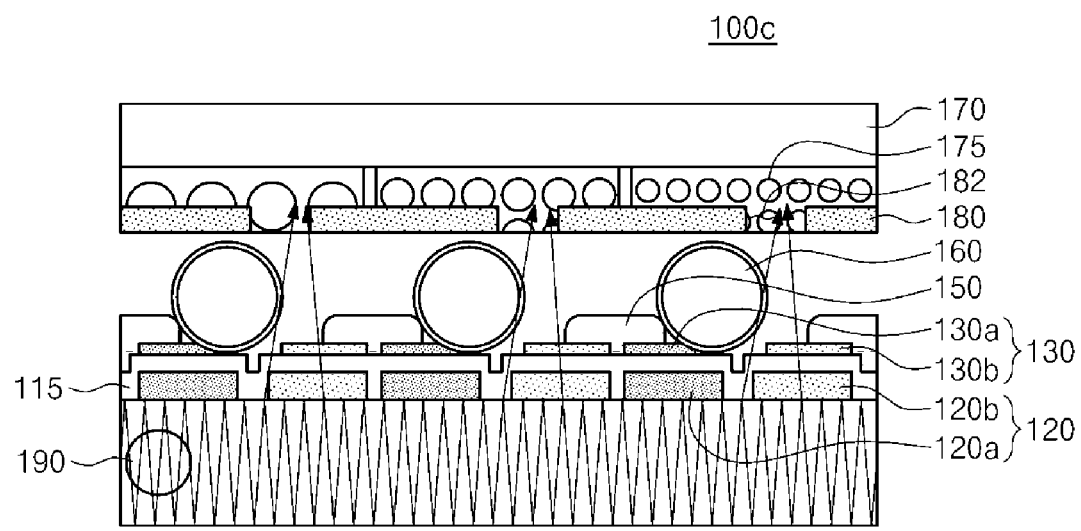

[Fig. 15]
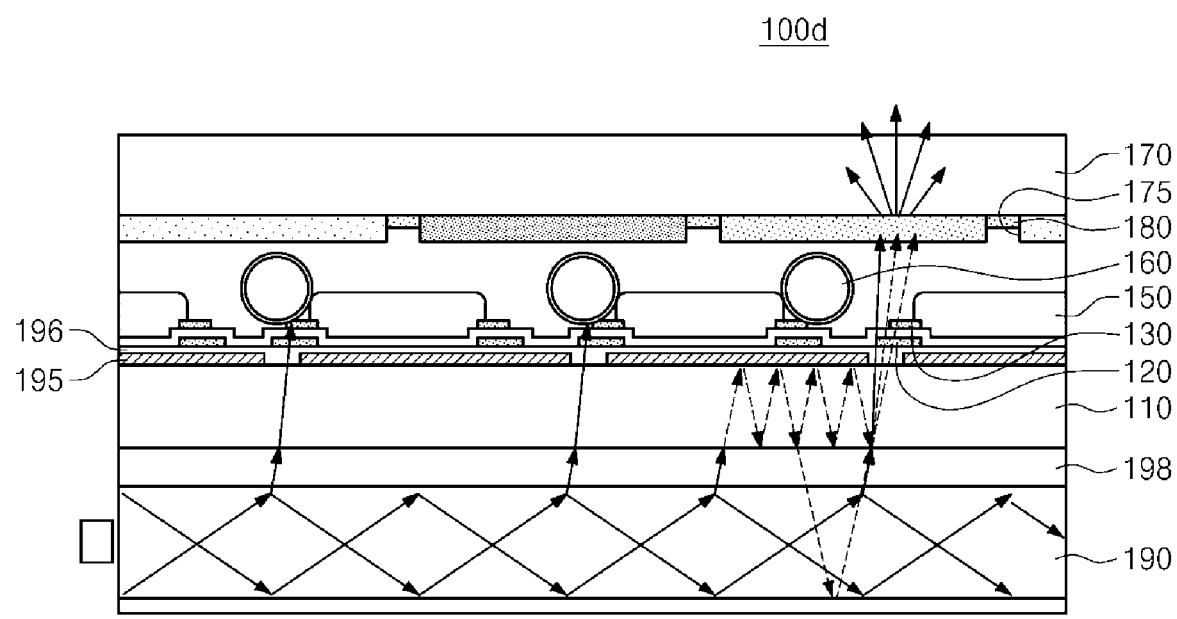

[Fig. 16]
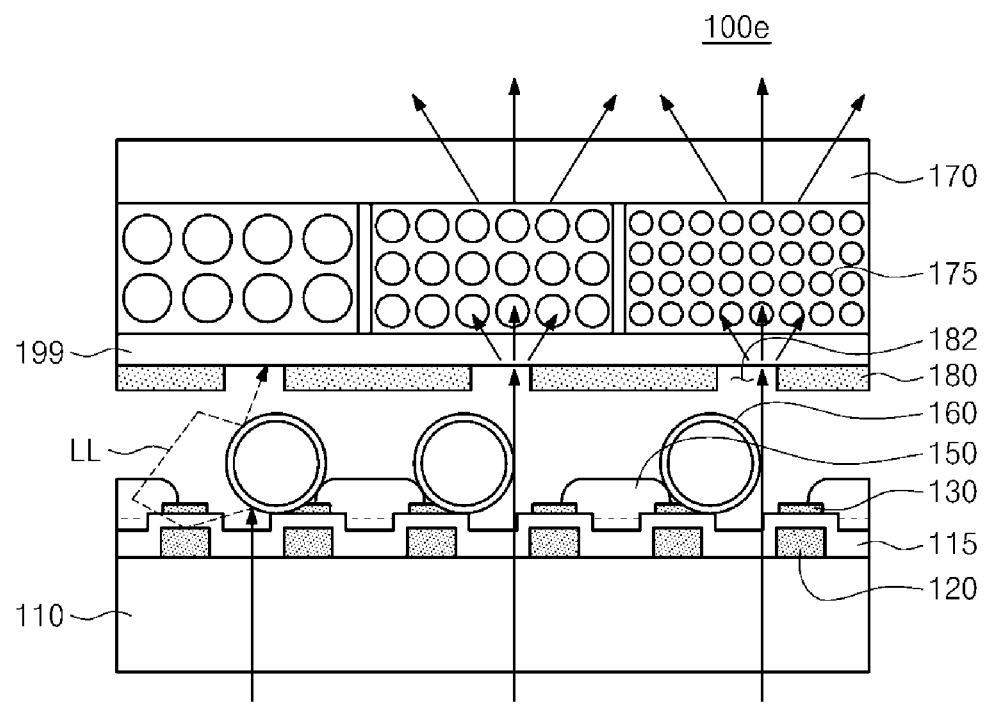

[Fig. 17]
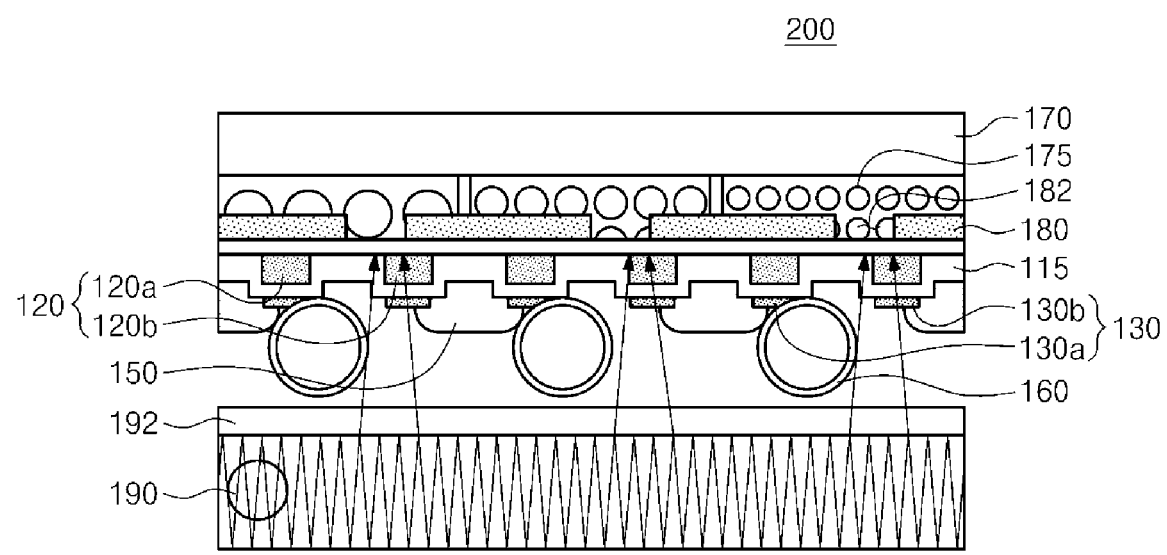

[Fig. 18]
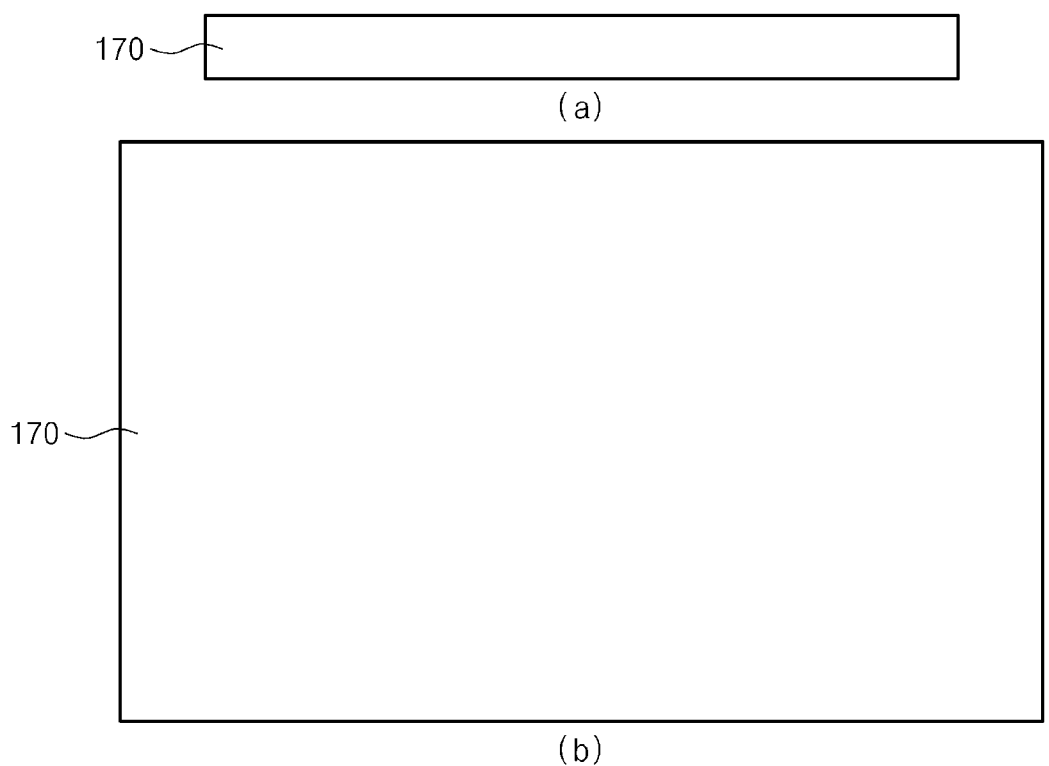

[Fig. 19]
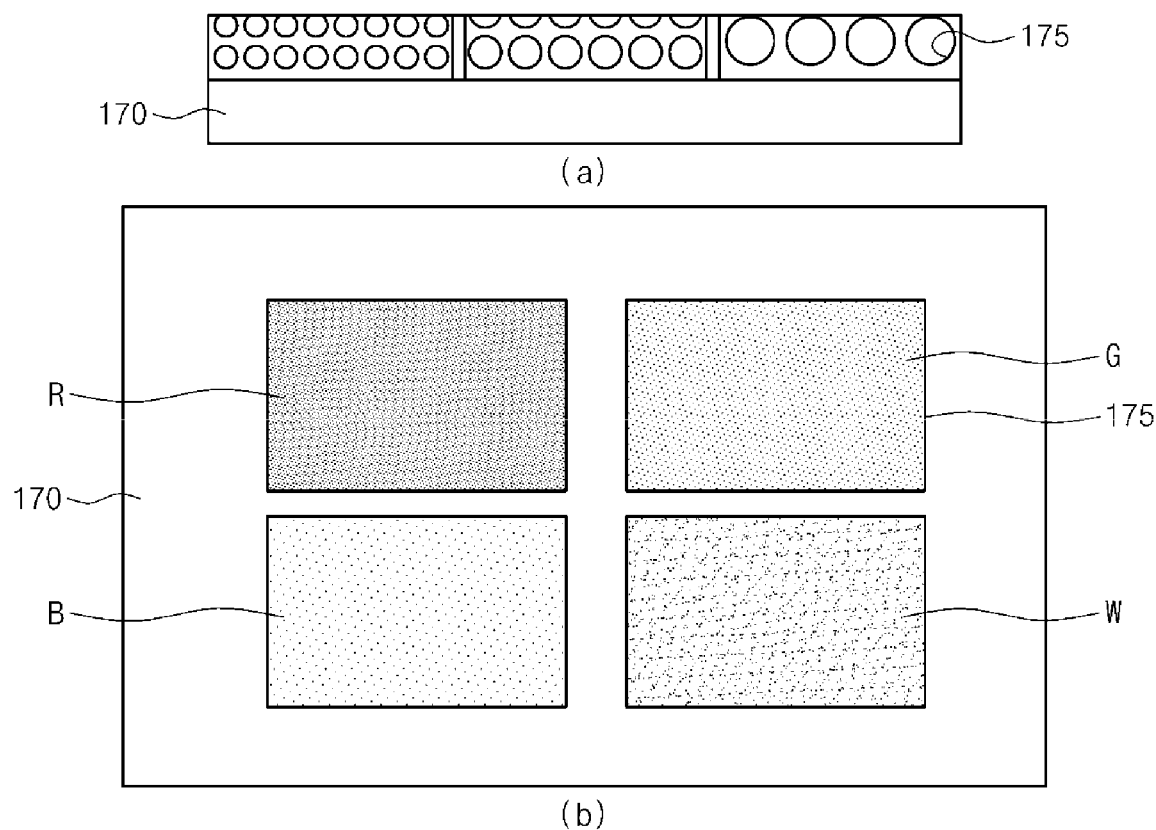

[Fig. 20]
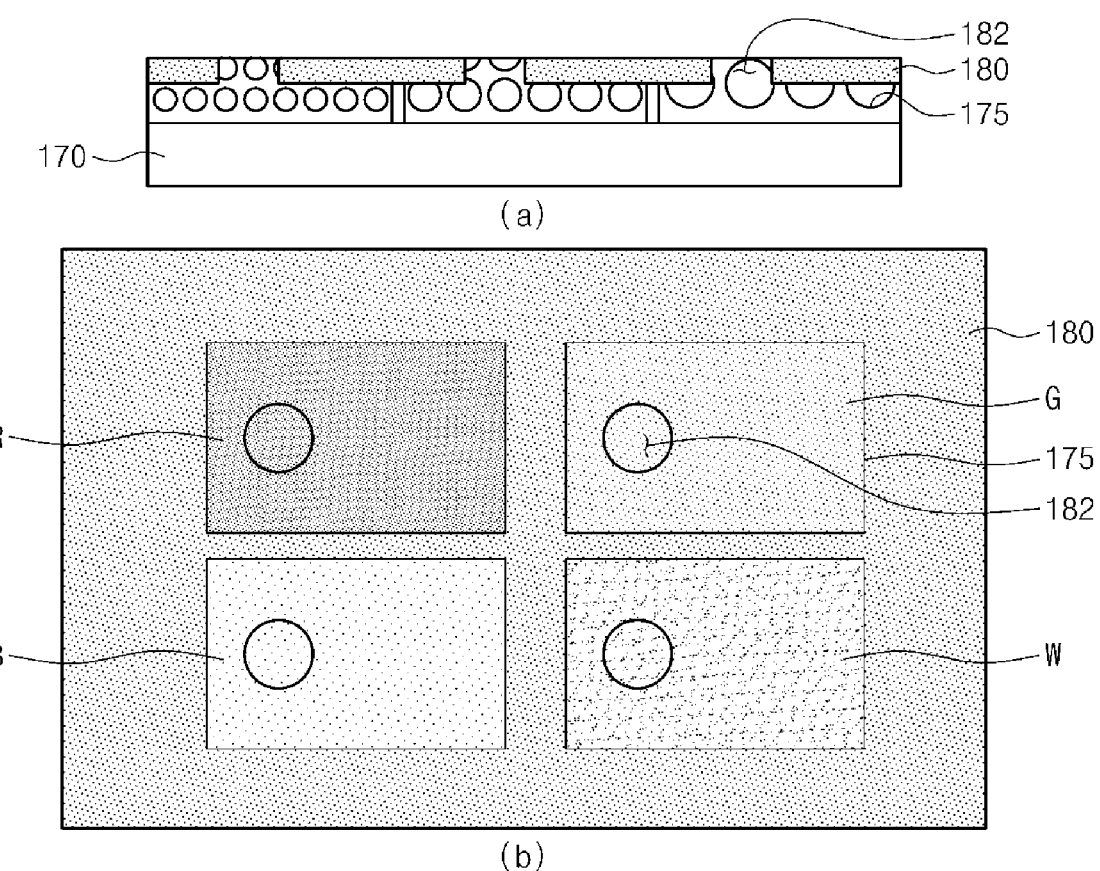

[Fig. 21]
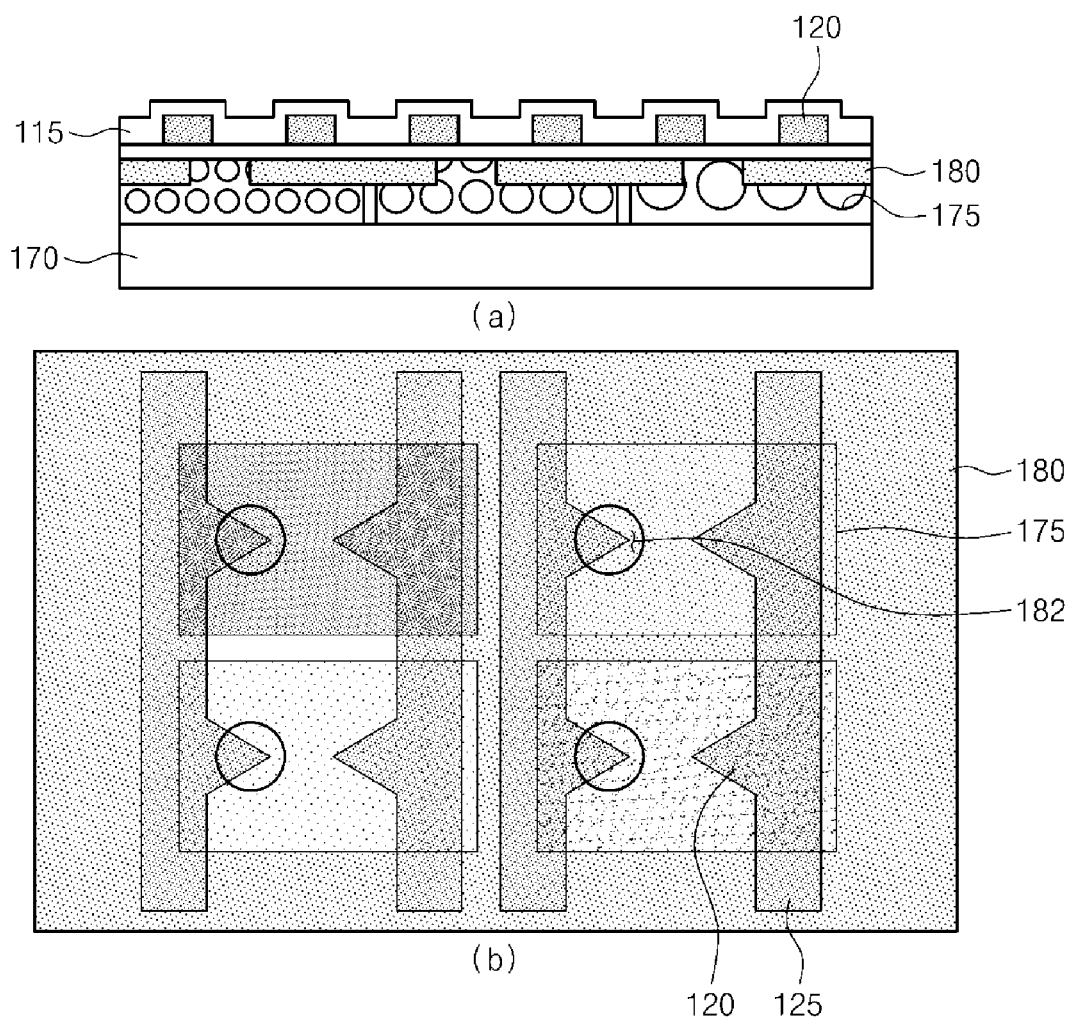

[Fig. 22]
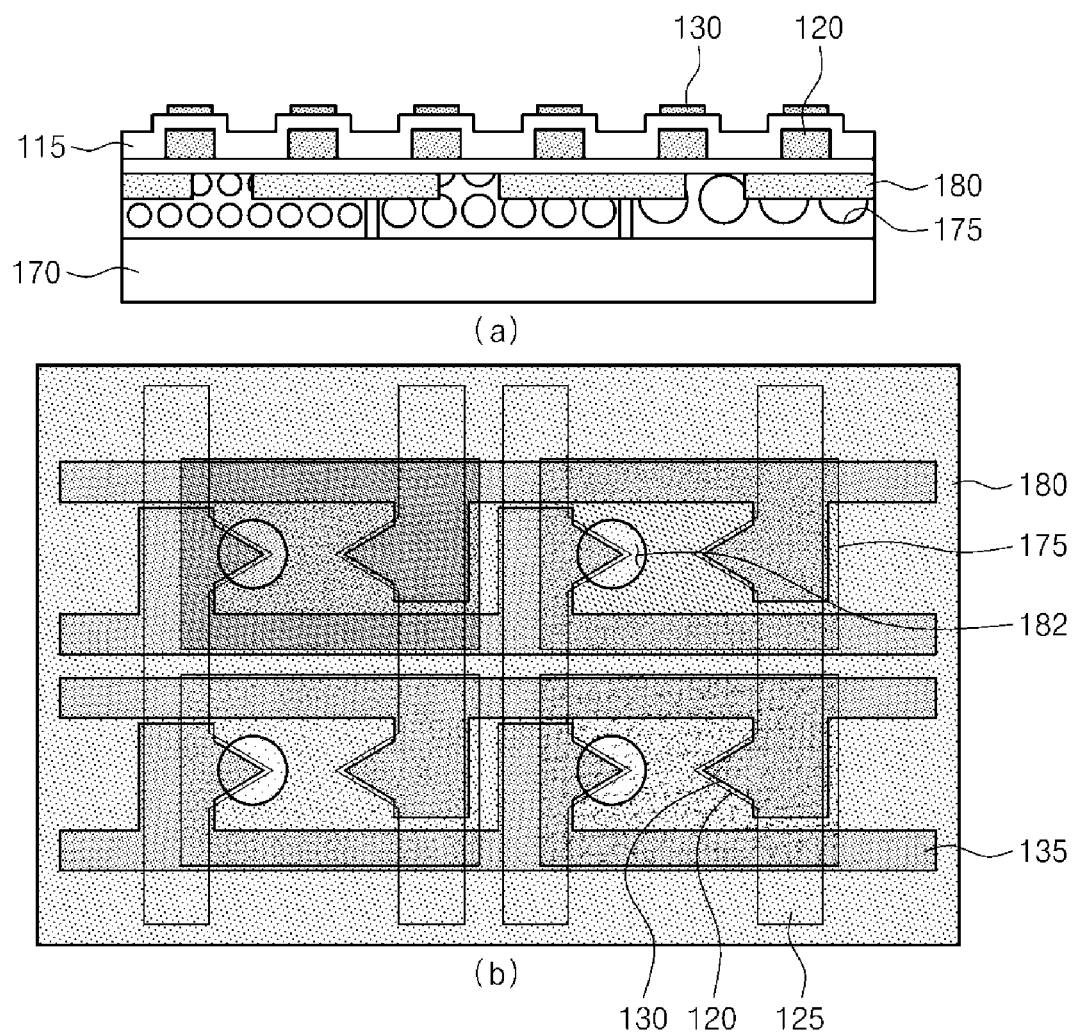

[Fig. 23]
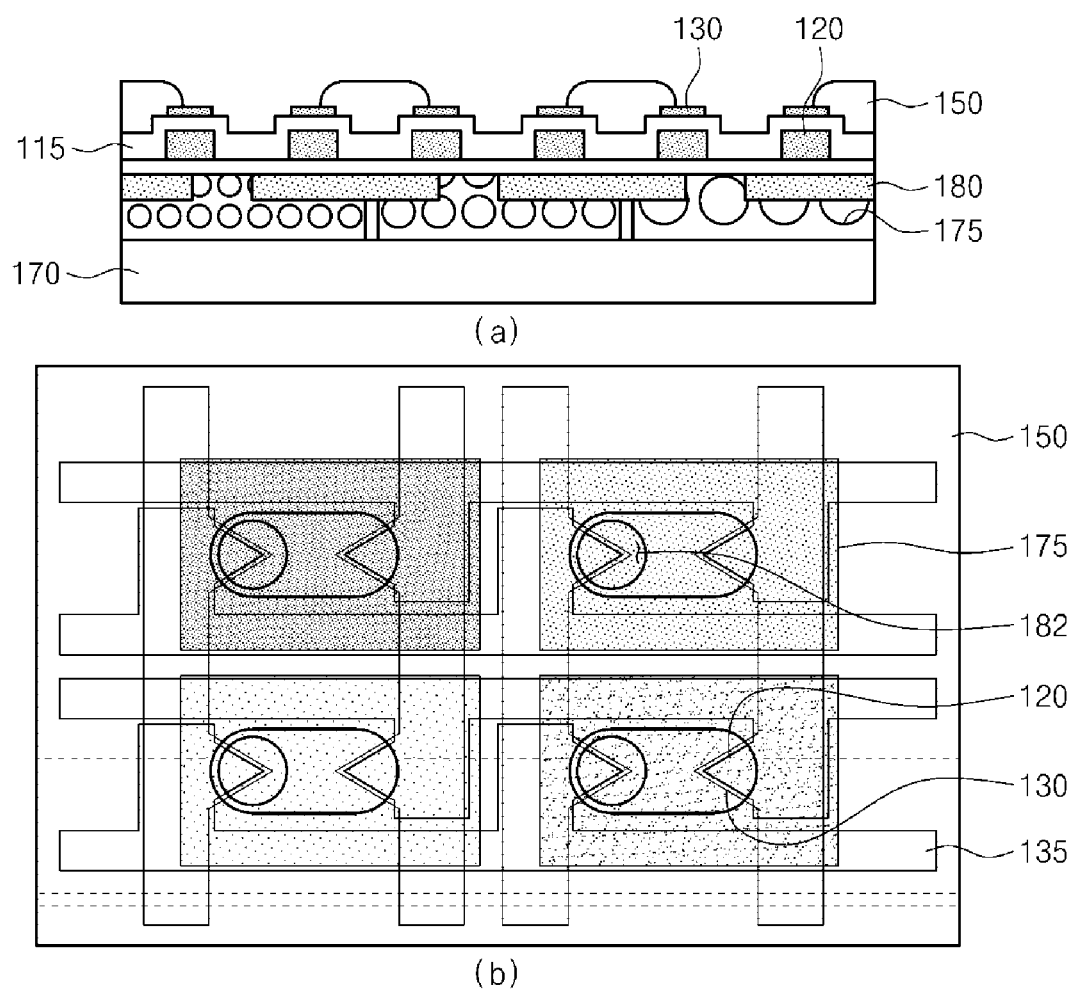

【Fig. 24】
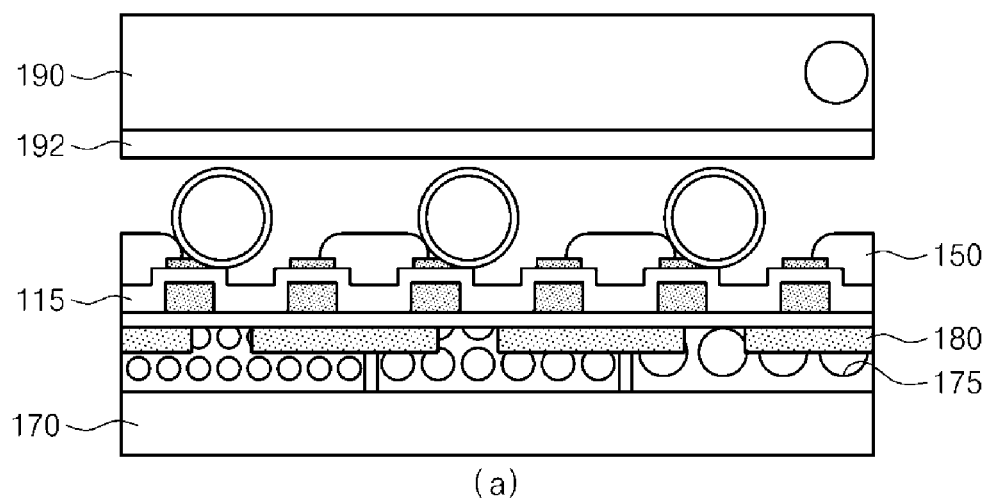
(a)
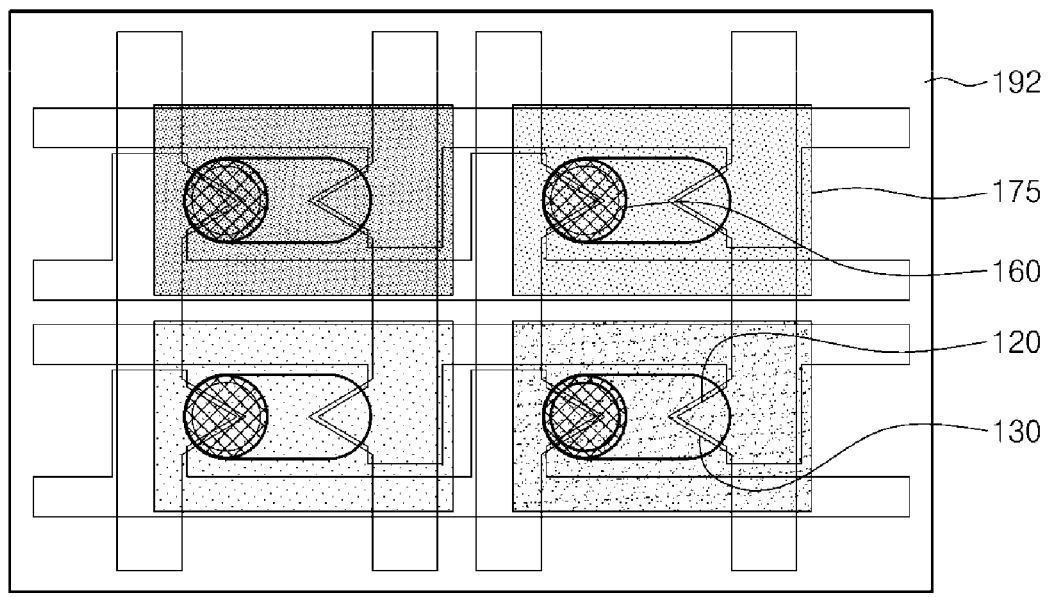
(b)

[Fig. 25]
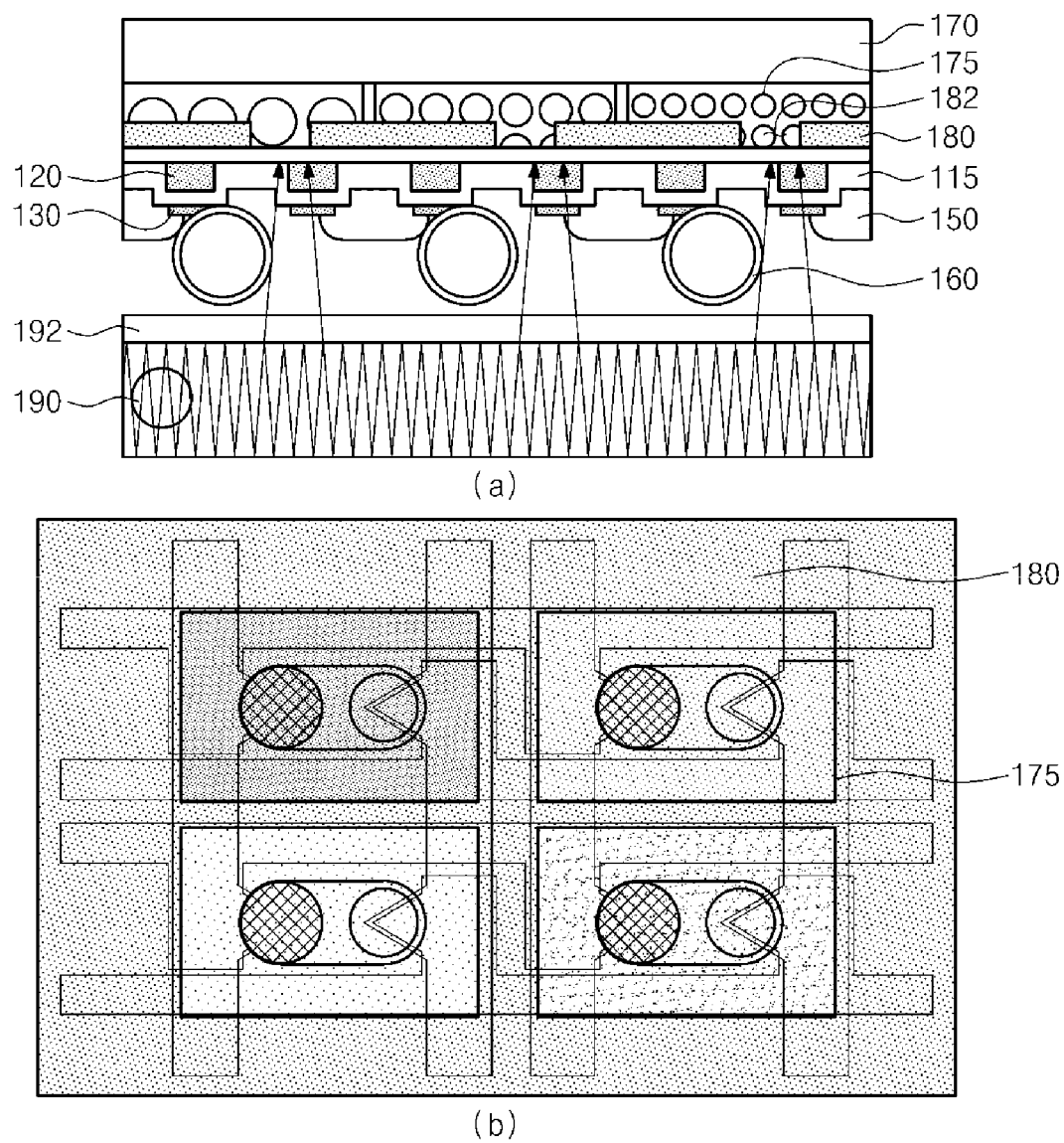
(a)
(b)

[Fig. 26]
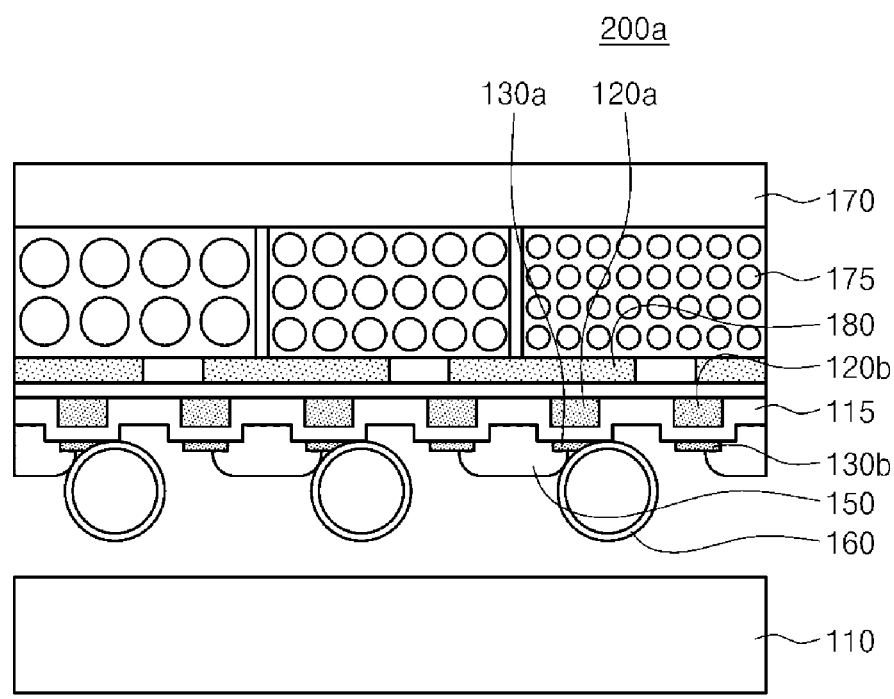

[Fig. 27]
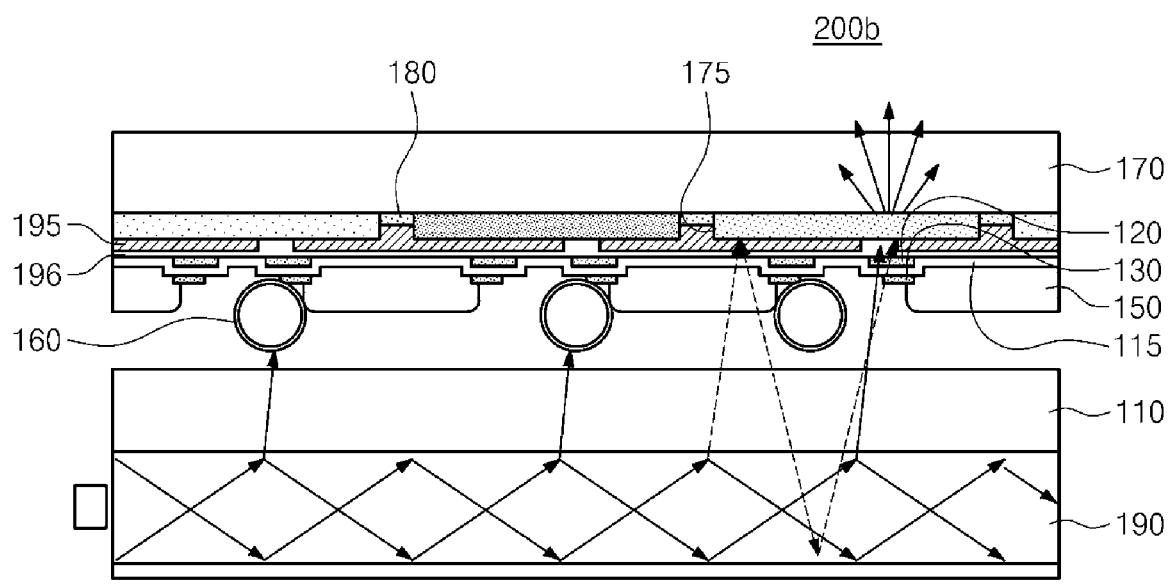

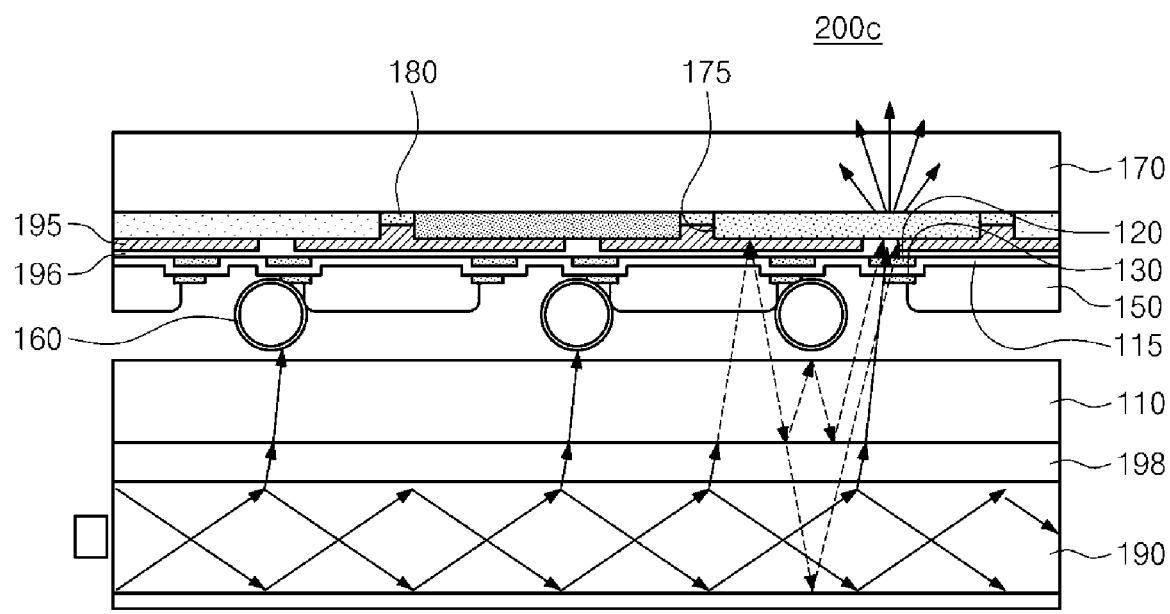
[Fig. 28]

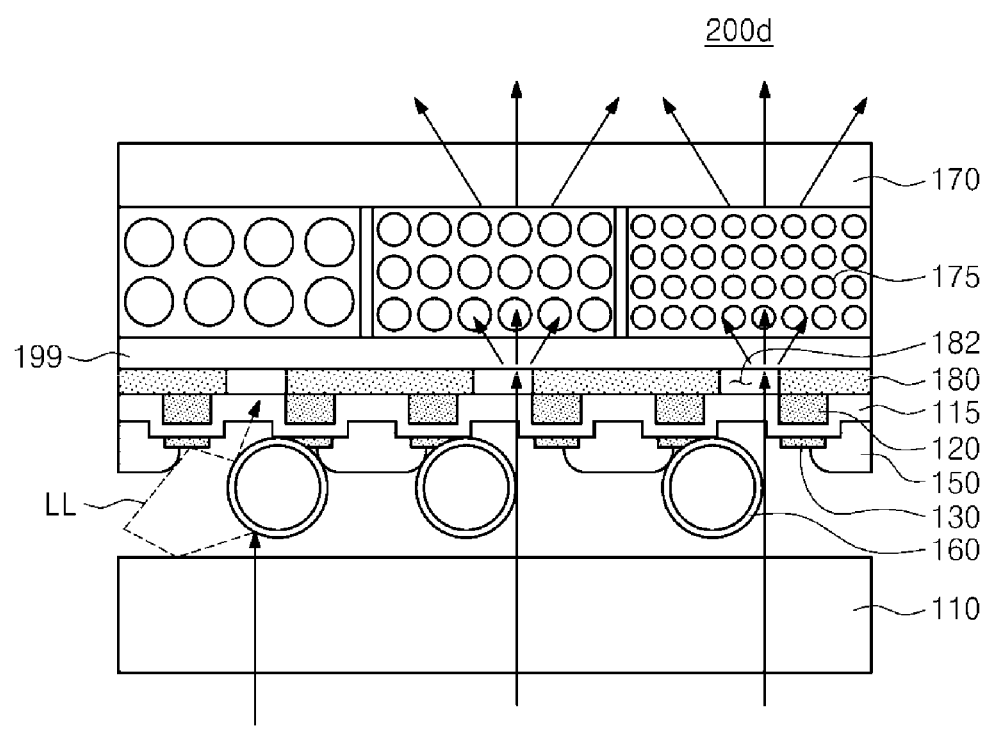
[Fig. 29]

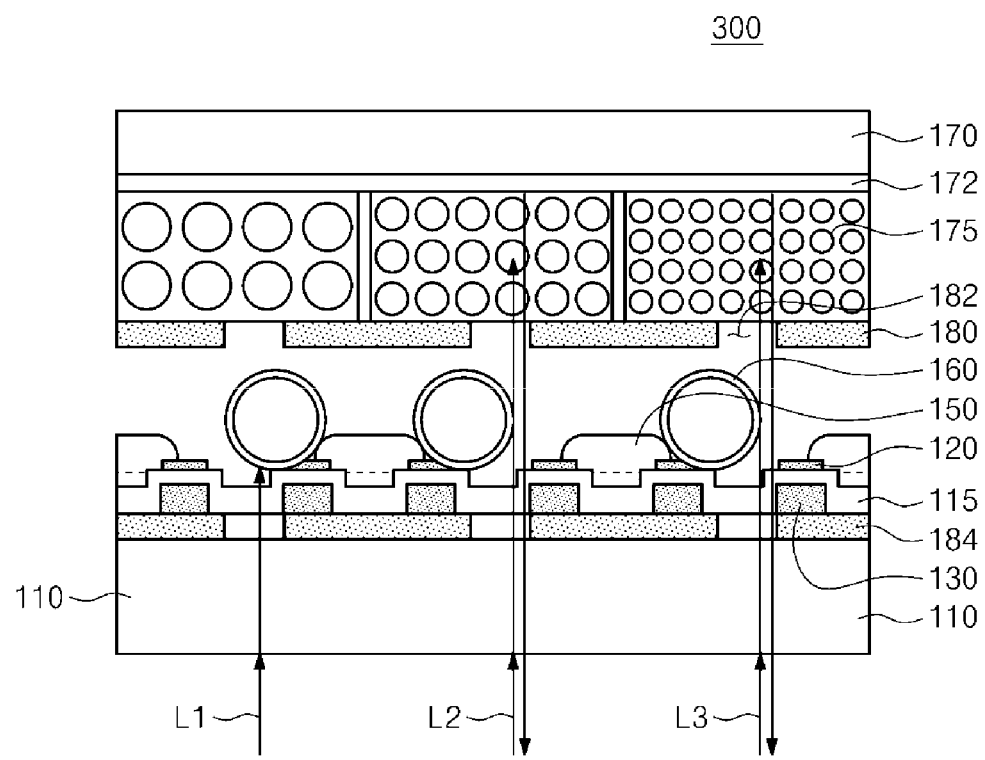
[Fig. 30]

DISPLAY DEVICE

CROSS-REFERENCE TO RELATED APPLICATION

This application is a continuation of International Application No. PCT/KR2018/001909 which was filed on Feb. 14, 2018 and claims priority to Korean Patent Application No. 10-2017-0021267 filed on Feb. 16, 2017 and Korean Patent Application No. 10-2018-0016059 filed on Feb. 9, 2018 in the Korean Intellectual Property Office, the disclosures of which are hereby incorporated by reference in their entireties.

TECHNICAL FIELD

The present invention relates to a display device, and more particularly, to a display device including a quantum dot film.

BACKGROUND ART

Currently, lots of researches and developments have been made on various methods of representing electronic paper displays, and the electronic paper displays are commercialized and used.

To order to realize the electronic paper displays, an electric field-driven display device has been studied.

An electric field driving method corresponds to a method of displaying an image by controlling the positions of conductive microparticles using an electric field generated due to a potential difference between opposing electrodes in a plane and by transmitting or blocking a light beam of the outside or a light unit according to the positions of the particles.

The inventors of the present invention have invented a structure and a method for improving light efficiency and a color reproduction range by employing a quantum dot film in the electric field-driven display device.

DISCLOSURE

Technical Problem

A technical objective of the present invention is to provide a display device having improved light efficiency.

Another technical objective of the present invention is to provide a display device having an improved color reproduction range.

Yet another technical objective of the present invention is to provide a display device in which a separate polarizing plate is not required.

Yet another technical objective of the present invention is to provide a display device having a simple structure of a device.

Technical objectives of the present invention are not limited to the above-described technical objects, and may be clarified by the following description.

Technical Solution

A display device according to an embodiment of the present invention may include a first substrate to which an external light beam is provided, a first control electrode and a second control electrode spaced apart from the first control electrode, the first and second control electrodes being provided on the first substrate, an insulation film provided on the first and second control electrodes, a first contact electrode at least partially overlapping the first control electrode and a second contact electrode spaced apart from the first contact electrode and at least partially overlapping the second control electrode, the first and second contact electrodes being formed on the insulation film, a shuttering driving body moving between the first contact electrode and the second contact electrode to transmit or block a light beam, a second substrate opposite to the first substrate, and a quantum dot film provided on the first substrate or the second substrate to adjust a wavelength of the light beam transmitted through the shuttering driving body.

A display device another embodiment of the present invention may include a first substrate to which an external light beam is provided, a second substrate opposite to the first substrate, a quantum dot film provided on the second substrate to adjust a wavelength of a light beam transmitted through a shuttering driving body, a first control electrode and a second control electrode spaced apart from the first control electrode, the first and second control electrodes being provided on the second substrate, an insulation film covering the first and second control electrodes, a first contact electrode at least partially overlapping the first control electrode and a second contact electrode spaced apart from the first contact electrode and at least partially overlapping the second control electrode, the first and second contact electrodes being formed on the insulation film, and a shuttering driving body moving between the first contact electrode and the second contact electrode to transmit or block the light beam.

A display device according to yet another embodiment may include a first substrate to which an external light beam is provided, a first control electrode and a second control electrode spaced apart from the first control electrode, the first and second control electrodes being provided on the first substrate, an insulation film provided on the first and second control electrodes, a first contact electrode at least partially overlapping the first control electrode and a second contact electrode spaced apart from the first contact electrode and at least partially overlapping the second control electrode, the first and second contact electrodes being formed on the insulation film, a shuttering driving body moving between the first contact electrode and the second contact electrode to transmit and block a light beam, a second substrate opposite to the first substrate, a quantum dot film provided on the first substrate or the second substrate to adjust a wavelength of a light beam transmitted through the shuttering driving body, and a light-reflective layer configured to reflect the light beam transmitted through the quantum dot film in a direction of the first substrate.

According to the embodiment of the present invention, the first control electrode and the second control electrode may be provided at each pixel, the display device may further include a first control line electrically connecting the first control electrodes provided at the pixels and a second control line electrically connecting the second control electrodes provided at the pixels and formed in parallel to the first control line, the first contact electrode and the second contact electrode may be provided at each pixel, the display device may further include a first contact line electrically connecting the first contact electrodes provided at the pixels and a second contact line electrically connecting the second contact electrodes provided at the pixels and formed in parallel to the first contact line, and the first control line and the second control line may be formed in directions that are different from the first contact line and the second contact line.

According to the embodiment of the present invention, the first control electrode and the first contact electrode overlap each other, the second control electrode and the second contact electrode overlap each other, the first control electrode and the second control electrode have polygonal shapes in which vertexes face each other, and the first contact electrode and the second contact electrode also have polygonal shapes in which vertexes face each other.

According to the embodiment of the present invention, the display device may further include a partition wall that partitions individual pixels, in which the partition wall may cover at least parts of the first contact electrode included in one pixel and the second contact electrode adjacent to the one pixel.

According to the embodiment of the present invention, light absorbing layer in which a light emission opening is formed to emit a light beam corresponding to an individual pixel may be provided in the quantum dot film, and the size of the shuttering driving body may be larger than the size of the light emission opening and may be smaller than a separation distance between the first contact electrode and the second contact electrode.

According to the embodiment of the present invention, the display device may further include a light recycling electrode formed in a layer different from a layer formed by the first and second control electrodes and configured to reflect a light beam provided from the outside.

According to the embodiment of the present invention, the display device may further include a reflective sheet configured to re-reflect the light beam reflected by the light recycling electrode.

According to the embodiment of the present invention, the display device may further include a light source and a light recycling sheet configured to reflect a light beam emitted from the light source in a direction of the light source.

According to the embodiment of the present invention, the display device may further include a reflective sheet configured to re-reflect the light beam reflected in a direction of the light source.

According to the embodiment of the present invention, a light absorbing layer in which a light emission opening is formed to emit a light beam corresponding to an individual pixel may be provided on the quantum dot film, and a light transmission opening corresponding to the light emission opening may be provided on the light recycling sheet.

According to the embodiment of the present invention, the display device may further include a light absorbing layer formed on one side of the quantum dot film, a light emission opening being formed in the light absorbing layer to emit the light beam corresponding to an individual pixel, in which the first control electrode and the first contact electrode may not overlap the light emission opening, the second control electrode and the second contact electrode may overlap the light emission opening, the first control electrode may have a property of reflecting a light beam, and the second control electrode may have a property of transmitting a light beam.

According to the embodiment of the present invention, the display device may further include a reflective sheet configured to re-reflect the light beam reflected by the first control electrode.

According to the embodiment of the present invention, the display device may further include a light-selective transmission layer provided on one surface of the quantum dot film, configured to transmit the light beam when a light beam having a light amount that is equal to or more than a threshold light amount is provided, and configured to block the light beam when a light beam having a light amount that is less than the threshold light amount is provided.

According to the embodiment of the present invention, the display device may further include a light source provided on one side of the first substrate, and a light recycling layer or a light recycling electrode provided on the second substrate to reflect a light beam emitted from the light source in a direction of the light source. According to the embodiment of the present invention, the display device may further include a light absorbing layer formed between the first substrate and a layer in which the first and second control electrodes are provided and configured to adjust the light emission opening.

According to yet another embodiment of the present invention, a display device may include a first substrate to which an external light beam is provided, a shuttering driving body moving within a predetermined distance and configured to transmit or block a light beam, an electrode configured to provide a driving force to the shuttering driving body, a second substrate opposite to the first substrate, and a quantum dot film provided on the first substrate or the second substrate to adjust a wavelength of the light beam transmitted through the shuttering driving body.

Advantageous Effects

A display device according to an embodiment of the present invention may include a first substrate to which an external light beam is provided, a first control electrode and a second control electrode spaced apart from the first control electrode, the first and second control electrodes being provided on the first substrate, an insulation film provided on the first and second control electrodes, a first contact electrode at least partially overlapping the first control electrode and a second contact electrode spaced apart from the first contact electrode and at least partially overlapping the second control electrode, the first and second contact electrodes being formed on the insulation film, a shuttering driving body moving between the first contact electrode and the second contact electrode to transmit or block a light beam, a second substrate opposite to the first substrate, and a quantum dot film provided on the first substrate or the second substrate to adjust a wavelength of the light beam transmitted through the shuttering driving body.

In the related art, since a light transmission amount of each pixel is controlled through an intersecting polarizing plate and a liquid crystal material, efficiency is low due to light absorption of the polarizing plate.

However, according to the embodiment of the present invention, since the light transmission amount of each pixel is controlled according to movement of the shuttering driving body, the light absorption of the polarizing plate can be resolved, so that light efficiency can be improved.

Further, in the related art, there is a process difficulty in aligning the polarization axis of the polarizing plate. However, according to the embodiment of the present invention, since the polarizing plate is not required, convenience in a process can be achieved.

Furthermore, according to the embodiment of the present invention, since the quantum dot film is provided, the quantum dot film widens a light emission surface, so that an image closer to a natural color can be provided to a viewer.

DESCRIPTION OF THE DRAWINGS

FIGS. 1 to 4 are views illustrating a structure of a display device according to a first embodiment of the present invention;

FIGS. 5 to 11 are views illustrating a method of manufacturing the display device according to the first embodiment of the present invention;

FIG. 12 is a view illustrating a first modification of the first embodiment of the present invention;

FIG. 13 is a view illustrating a second modification of the first embodiment of the present invention;

FIG. 14 is a view illustrating a third modification of the first embodiment of the present invention;

FIG. 15 is a view illustrating a fourth modification of the first embodiment of the present invention;

FIG. 16 is a view illustrating a fifth modification of the first embodiment of the present invention;

FIG. 17 is a view illustrating a structure of a display device according to a second embodiment of the present invention;

FIGS. 18 to 25 are views illustrating a method of manufacturing a display device according to the second embodiment of the present invention;

FIG. 26 is a view illustrating a first modification of the second embodiment of the present invention;

FIG. 27 is a view illustrating a second modification of the second embodiment of the present invention;

FIG. 28 is a view illustrating a third modification of the second embodiment of the present invention;

FIG. 29 is a view illustrating a fourth modification of the second embodiment of the present invention; and FIG. 30 is a view illustrating a structure of a display device according to a third embodiment.

[Mode]

Hereinafter, exemplary embodiments of the present invention will be described in detail with reference to the accompanying drawings.

However, the technical spirit of the present invention is not limited to embodiments described herein but may be embodied in other forms.

Instead, the embodiments described herein are provided such that contents disclosed can be thorough and complete and the spirit of the present invention can be fully transferred to those skilled in the art.

In the present specification, in a case where it is mentioned that a first component is located on a second component, this case means that the first component is directly formed on the second component or the first component is formed on the second component with a third component interposed therebetween.

Further, in the drawings, the size, the shape, and the thickness of a configuration are exaggeratedly illustrated for effective description of the technical contents.

Further, although terms "first", "second", "third", and the like in various embodiments of the present specification are used to describe various components, these components should not be limited by these terms.

These terms have only been used to distinguish one component from another component.

Further, in the present specification, the term "and/or" is used to mean that a component includes at least one of components listed before and after the term.

In the specification, a singular expression includes a plural expression unless the context is clearly stated otherwise.

Further, the term "include" or "have" is intended to specify presence of features, numbers, steps, components, and combinations thereof stated in the specification, but should not be understood to exclude presence or addition of one or more other features, numbers, steps, components, and combinations thereof.

Further, in the present specification, the term "connection" means indirect connection and direct connection between a plurality of components.

Further, in the following description of the present invention, when it is determined that detailed description of related widely-known functions or configurations makes the subject matter of the present invention unclear, the detailed description will be omitted.

FIGS. 1 to 4 are views illustrating a structure of a display device 100 according to a first embodiment of the present invention.

Referring to FIGS. 1 to 4, the display device according to the first embodiment of the present invention may include at least one of a first substrate, a first control electrode 120a, a second control electrode 120b spaced apart from the first control electrode 120a, an insulation film 115, a first contact electrode 130a and a second contact electrode 130b, a shuttering driving body 160, a second substrate 170, and a quantum dot film 175.

Further, the display device may further include a light recycling sheet 192. Hereinafter, each configuration will be described.

The first substrate may provide a support surface of the display device 100 according to the first embodiment of the present invention.

For example, the first substrate may be made of at least one of glass and a polymer film.

An external light beam may be provided to a lower end of the first substrate. For example, the external light beam may be a natural light beam around the display device 100 without a separate light source or may be a light beam provided from a separate light source.

Hereinafter, for convenience of description, it is assumed that there is a separate light source 190 for providing the external light beam.

The first substrate may be provided between the light source 190 and a layer configured by the first and second control electrodes 120 (120a and 120b).

For example, the first substrate may be provided between the layer configured by the first and second electrodes 120 (120a and 120b) and the light recycling sheet 192, which will be described below.

Unlike this, it is apparent that the first substrate may be provided between the light recycling sheet 192, which will be described below, and the light source 190.

Further, the first substrate may be provided on the upper surface of the light source 190 integrally with the light source 190.

The first substrate is not illustrated in FIG. 1. However, hereinafter, for convenience of description, it is assumed that the first substrate is provided between the light recycling sheet 192 and the light source 190.

The light recycling sheet 192 may be provided on the first substrate.

The light recycling sheet 192 may function to reflect a light beam provided from the light source 190 toward the light source 190.

To this end, the light recycling sheet 192 may be made of metal having reflectivity.

Since the light recycling sheet 192 reflects a light beam emitted from the light source 190, the degree of integration of a light beam provided to the second substrate 170, which will be described below, may be improved.

In other viewpoints, since loss caused when the light beam emitted from the light source 190 is provided to the second substrate 170, light efficiency may be improved.

The control electrodes 120 including the first control electrode 120a and the second control electrode 120b may be formed on the light recycling sheet 192.

The first control electrode 120a and the second control electrode 120b may function to control the position of the shuttering driving body 160, which will be described below.

To this end, the first control electrode 120a and the second control electrode 120b may be made of a conductive material.

At this time, the first control electrode 120a and the second control electrode 120b may be transparent electrodes such that the light beam passing through the light recycling sheet 192 can be transmitted therethrough, and may be made of at least one of, for example, indium tin oxide (ITO), indium zinc oxide (IZO), aluminum zinc oxide (AZO), and indium zinc tin oxide (IZTO).

The first control electrode 120a and the second control electrode 120b may be provided at each pixel, and may be spaced apart from each other by a predetermined distance.

A separation distance between the first control electrode 120a and the second control electrode 120b may provide a movement path to the shuttering driving body 160, which will be described below.

According to one embodiment, the first control electrode 120a and the second control electrode 120b may have a polygonal shape in which vertices are oriented to each other such that a drive force, that is, an electric field, is effectively provided to the shuttering driving body 160.

For example, the first control electrode 120a and the second control electrode 120b may have a triangular shape.

Further, according to the embodiment, the display device 100 may further include a first control line 125a electrically connecting the first control electrodes provided in the pixels and a second control line 125b electrically connecting the second control electrodes provided in the pixels.

At this time, the first control line 125a and the second control line 125b may be spaced apart from each other to extend in parallel to each other.

Further, the first and second control electrodes 120a and 120b and the first and second control lines 125a and 125b may be formed at the same plane level.

In other viewpoints, the first and second control electrodes 120a and 120b and the first and second control lines 125a and 125b may be formed together. The insulation film 115 may be formed on the first and second control electrodes 120.

An insulation layer 130 may be made of at least one of silicon oxide (SixOy), aluminum oxide (AlxOy), hafnium oxide (HfxOy), zirconium oxide (ZrxOy), yttrium oxide (YxOy), lanthanum oxide (LaxOy), tantalum oxide (TaxOy), praseodymium oxide (PrxOy), titanium oxide (TixOy), aluminum silicon oxide (AlxSiyOz), zirconium silicon oxide (ZrSixOy), and hafnium silicon oxide (HfSixOy), and may have a single-layered structure or a multi-layered structure.

Contact electrodes 130 including the first contact electrode 130a and the second contact electrode 130b may be formed on the insulation film 115.

The first contact electrode 130a and the second contact electrode 130b may function to control the position of the shuttering driving body 160 in cooperation with the control electrodes 120 described above.

To this end, the first contact electrode 130a and the second contact electrode 130b may be made of a conductive material.

At this time, the first control electrode 120a and the second control electrode 120b may be transparent electrodes such that the light beam transmitted through the light recycling sheet 192 can be transmitted therethrough, and may be made of at least one of, for example, indium tin oxide (ITO), indium zinc oxide (IZO), aluminum zinc oxide (AZO), and indium zinc tin oxide (IZTO).

The first contact electrode 130a and the second contact electrode 130b may be provided at each pixel, and may be spaced apart from each other by a predetermined distance.

A separation distance between the first contact electrode 130a and the second contact electrode 130b may provide the movement path to the shuttering driving body 160, which will be described below.

According to one embodiment, the first contact electrode 130a and the second contact electrode 130b may have a polygonal shape in which vertices are oriented to each other such that a drive force, that is, an electric field, is effectively provided to the shuttering driving body 160.

For example, the first contact electrode 130a and the second contact electrode 130b may have a triangular shape.

At this time, the first contact electrode 130a at least partially overlaps the first control electrode 120a.

For example, the first contact electrode 130a has the same shape as the first control electrode 120a, and thus may overlap the first control electrode 120a as a whole.

Further, the second contact electrode 130b also at least partially overlaps the second control electrode 120b.

For example, the second contact electrode 130b has the same shape as the second control electrode 120b, and thus may overlap the second control electrode 120b as a whole.

Since the contact electrodes 130 and the control electrodes 120 have the same shape and overlap each other as a whole, an electric field applied to the shuttering driving body 160 may be maximized.

Further, according to the embodiment, the display device 100 may further include a first contact line 135a electrically connecting the first contact electrodes 130a provided in the pixels and a second contact line 135b electrically connecting the second contact electrodes 130b provided in the pixels.

At this time, the first contact line 135a and the second contact line 135b may be spaced apart from each other to extend in parallel to each other.

Further, the first and second contact electrodes 130a and 130b and the first and second contact lines 135a and 135b may be formed at the same plane level.

In other viewpoints, the first and second contact electrodes 130a and 130b and the first and second contact lines 135a and 135b may be formed together.

Further, the first and second control lines 125a and 125b may be provided in different directions with respect to the first and second contact lines 135a and 135b, for examples, in directions shifted by 90 degrees.

A partition wall 150 may be provided in direct contact with the first and second contact electrodes 130a and 130b, and may function to partition the respective pixels.

In more detail, the partition wall 150 may cover at least a part of the first contact electrode included in one pixel and at least a part of the second contact electrode adjacent to the one pixel.

That is, the partition wall 150 may cover at least a part of a second contact electrode of a first pixel PXL1, at least a part of a first contact electrode of a second pixel PXL2, at least a part of a second contact electrode of the second pixel PXL2, and at least a part of a first contact electrode of a third pixel PXL3.

In other viewpoints, as illustrated in FIG. 3, the partition wall 150 may provide an end wall so as not to deviate from the movement path of the shuttering driving body 160.

The shuttering driving body 160 may be provided in direct contact with the contact electrodes 130 and may function to transmit and block a light beam while moving between the first contact electrode 130a and the second contact electrode 130b.

That is, the shuttering driving body 160 may function to adjust the amount of transmitted light for each pixel when the light beam emitted from the light source 190 is provided to a viewing surface.

To this end, the shuttering driving body 160 may be made of a black impermeable material.

The shuttering driving body 160 may have a structure in which a conductive film is coated on a polymer as an insulator base.

Accordingly, since the shuttering driving body 160 has no permanent charge, the shuttering driving body 160 may be moved by the control electrodes 120 and the contact electrodes 130, which will be described below.

That is, the shuttering driving body 160 may have no permanent charge, may be positively or negatively charged according to an applied voltage, and may have a spherical shape having a diameter of several micrometers to several hundreds of micrometers to facilitate the movement.

At this time, a conductive film of the shuttering driving body 160 may be made of a material having excellent electrical properties, for example, metal such as gold and aluminum or a conductive material such as a transparent conductive oxide (TCO) and a conductive polymer.

A driving mechanism of the shuttering driving body 160 will be described below.

The second substrate 170 may also provide a support surface of the display device 100 according to the first embodiment of the present invention.

For example, the second substrate 170 may be made of at least one of glass and a polymer film.

The quantum dot film 175 may be provided on one surface, for example, the lower surface, of the second substrate 170.

The quantum dot film 175 may convert the light beam provided to the quantum dot film 175 into a light beam having a color corresponding to each pixel. In other viewpoints, the quantum dot film 175 may adjust the wavelength of the light beam.

For example, the quantum dot film 175 provided in the first pixel PXL1 of FIG. 1 may be configured with a quantum dot that adjusts the wavelength of the light beam to the wavelength of a red light beam, the quantum dot film 175 provided in the second pixel PXL2 may be configured with a quantum dot that adjusts the wavelength of the light beam to the wavelength of a green light beam, and the quantum dot film 175 provided in the third pixel PXL3 may be configured with a quantum dot that adjusts the wavelength of the light beam to the wavelength of a blue light beam.

When the light source 190 emits the blue light beam, the quantum dot that adjusts the wavelength of the light beam to the wavelength of the blue light beam may be omitted.

it is apparent that when the light source 190 emits a white light beam, a color filter that emits the white light beam may be provided.

A light absorbing layer 180 may further provided on the lower surface of the quantum dot film 175.

A light emission opening 182 may be formed in the light absorbing layer 180 to emit a light beam corresponding to each pixel.

At this time, the size of the shuttering driving body 160 may be larger than the size of the light emission opening 182 and may be smaller than a separation distance between the first contact electrode and the second contact electrode.

Hereinabove, the structure of the display device 100 according to the first embodiment has been described with reference to FIGS. 1 to 4.

Hereinafter, in succession, a method of operating the display device 100 according to the first embodiment of the present invention will be described with reference to FIG. 1.

The shuttering driving body 160 may move according to voltage polarities of the control electrodes 120 and the contact electrodes 130.

For example, when the shuttering driving body 160 is in contact with the first contact electrode 120a, the shuttering driving body 160 may be continuously in contact with the first contact electrode 130a or may move to the second contact electrode 130b, according to the polarities of the voltages applied to the control electrodes 120 and 130.

In more detail, when a positive voltage is applied to the first contact electrode 130a and the first control electrode 120a, and a negative voltage is applied to the second contact electrode 130b and the second control electrode 120b, the shuttering driving body 160 is charged to a positive polarity by the contacting first contact electrode 130a, and is thus moved to the second contact electrode 130b having an opposite polarity.

When the shuttering driving body 160 moves to the second contact electrode 130b to come into contact with the second contact electrode 130b, the shuttering driving body 160 is charged to a negative polarity to move to the first contact electrode 130a again.

At this time, when the voltage having the same condition is maintained, the shuttering driving body 160 repeatedly moves between the first contact electrode 130a and the second contact electrode 130b at a high speed.

A light transmittance during a mean time is changed according to the speed of the shuttering driving body 160, so that a gradation can be expressed.

Additionally, when a negative voltage is applied to the first control electrode 120a while the voltage having the same condition is maintained, the shuttering driving body 160 is charged to a positive polarity when moving to the first contact electrode 130a, and the position of the shuttering driving body 160 is fixed by the first control electrode 120a close to the shuttering driving body 160.

In this case, the light beam emitted from the light source 190 passes through the shuttering driving body 160 to be input to the quantum dot film 175.

Accordingly, the light beam having a color required by the quantum dot film 175 may be provided to the viewing surface (see PXL1 and PXL2 of FIG. 1).

In contrast, when a positive voltage is applied to the first contact electrode 130a, the first control electrode 120a, and the second control electrode 120b, and a negative voltage is applied to the second contact electrode 130b, the shuttering driving body 160 is charged to a negative polarity when moving to the second contact electrode 130b, and the position of the shuttering driving body 160 is fixed by the second control electrode 120b close to the shuttering driving body 160, so that a light beam to the quantum dot film 175 can be blocked.

In this case, the corresponding pixel is displayed in black (see PXL3 of FIG. 1).

Further, the light recycling sheet 192 reflects the light beam such that the light beam emitted from the light source 190 can be provided to the light emission opening 182 without loss, as described above.

Accordingly, since the amount of the light transmitted through the shuttering driving body 160 is maximized, light efficiency can be improved.

Further, since the quantum dot film 175 functions to adjust a color, an emission angle of the light beam emitted from the light source 190 and having high directivity is widened, so that a natural color sense can be provided.

Hereinabove, a driving mechanism of the display device 100 according to the first embodiment of the present invention has been described.

Hereinafter, a method of manufacturing the display device according to the first embodiment of the present invention will be described with reference to FIGS. 5 to 11.

FIGS. 5 to 11 are views illustrating a method of manufacturing the display device according to the first embodiment of the present invention.

In the method of manufacturing the display device according to the first embodiment of the present invention, the display device is the same as the display device according to the first embodiment, which has been described with reference to FIGS. 1 to 4. Therefore, duplicated description will be omitted.

Further, in FIGS. 5 to 11, figure (A) illustrated at an upper end of each figure illustrates a cross section, and figure (B) illustrated at a lower end of each figure illustrates a plane.

Referring to FIG. 5, the light source 190 may be provided.

Although not illustrated, the first substrate may be provided on the light source 190.

Unlike this, it is apparent that the first substrate may be provided on the light recycling sheet.

Referring to FIG. 6, the light recycling sheet 192 may be provided.

As illustrated in FIG. 6B, a light transmission opening 194 through which the light beam emitted from the light source 190 is transmitted may be provided in the light recycling sheet 192.

The light beam reflected by the light recycling sheet 192 may be provided to the shuttering driving body 160 through the light transmission opening 194 at high concentration of light.

The light transmission opening 194 may at least partially overlap the light emission opening 182, and may at least partially overlap the second control electrode 120b and the second contact electrode 130b.

Referring to FIG. 7, a control electrode layer may be provided on the light recycling sheet 192.

The control electrode layer may include the first and second control electrodes 120a and 120b and the first and second control lines 125a and 125b. The control electrode layer may be deposited by, for example, sputtering.

It is apparent that the control electrode layer may be formed by a solution process.

As described above, the first and second control electrodes 120a and 120b may be spaced apart from each other, and may have triangular shapes in which vertexes face each other.

Further, the first control line 125a may electrically connect neighboring first control electrodes, and the second control line 125b may electrically connect neighboring second control electrodes.

At this time, the second control electrode 120b may at least partially overlap the light transmission opening 194.

Accordingly, the collected light beam can be provided to the second control electrode 120b.

Further, the collected light can be transmitted through the second control electrode 120b made of a transparent electrode.

Referring to FIG. 8, the insulation film 115 may be formed on the control electrode layer.

A contact electrode layer may be formed on the insulation film 115.

The contact electrode layer may include the first and second contact electrodes 130a and 130b and the first and second contact lines 135a and 135b.

The contact electrode layer may be deposited by, for example, sputtering.

It is apparent that the contact electrode layer may be formed by a solution process.

As described above, the first and second contact electrodes 130a and 130b may be spaced apart from each other, and may have triangular shapes in which vertexes face each other.

Further, the first contact line 135a may electrically connect neighboring first contact electrodes, and the second contact line 135b may electrically connect neighboring second contact electrodes.

Further, the first contact electrode 130a may overlap the first control electrode 120a, and the second contact electrode 130b may overlap the second control electrode 120b.

Further, the first and second contact lines 135a and 135b may extend in directions that are different from those of the first and second control lines 125a and 125b.

At this time, the second contact electrode 130b may at least partially overlap the light transmission opening 194.

Accordingly, the collected light beam can be provided to the second contact electrode 130b.

Further, the collected light can be transmitted through the second contact electrode 130b made of a transparent electrode.

Referring to FIG. 9, the partition wall 150 and the shuttering driving body 160 may be formed.

The partition wall 150 may be made of an organic film, and can function to limit the movement path of the shuttering driving body 160.

In other viewpoints, the partition wall 150 can provide the movement path to the shuttering driving body 160 between a region of the first control electrode 120a and the first contact electrode 130a and a region of the second control electrode 120b and the second contact electrode 130b.

The shuttering driving body 160 may be provided on a movement path provided by the partition wall 150.

Referring to FIG. 10, the second substrate 170 on which the light absorbing layer 180 and the quantum dot film 175 are provided may be provided.

As illustrated in FIG. 10, the quantum dot film 175 may have an RGBW pixel structure.

Accordingly, the display device 100 according to the first embodiment of the present invention can be provided.

Accordingly, as illustrated in FIG. 11, the light beam collected by the light recycling sheet 192 can be provided, and the amount of the light beam transmitted through each pixel can be controlled according to the average moving speed and the position of the shuttering driving body 160.

The wavelength of the light beam transmitted through the shuttering driving body 160 can be adjusted to the wavelength of a required color by the quantum dot film 175, and the light beam can be provided to the viewing surface.

Hereinabove, in the display device 100 according to the first embodiment of the present invention, which has been described with reference to FIGS. 1 to 11, since the shuttering driving body 160 performs a light shutter function, a required image can be provided even without a separate polarizing layer.

Accordingly, in the display device 100 according to the first embodiment of the present invention, a precise process for forming the polarizing layer may be omitted, and optical loss due to the polarizing layer may be reduced.

Furthermore, since the light recycling sheet 192 can increase the amount of the light transmitted through the second control electrode 120b, light efficiency can be improved.

Further, since the wavelength of a color of the light beam passing through the quantum dot film 175 is adjusted, and the light beam has a wide light emission angle, an excellent color sense can be provided.

Meanwhile, in description of the display device 100 according to the first embodiment of the present invention, it is assumed that the quantum dot film 175 is formed on the second substrate 170. However, unlike this, the quantum dot film 175 may be formed on the first substrate.

In this case, the quantum dot film 175 may be located below the control electrode layer.

Hereinabove, the display device 100 according to the first embodiment of the present invention has been described with reference to FIGS. 1 to 11.

Hereinafter, modifications of the first embodiment of the present invention will be described with reference to FIGS. 12 to 16.

For convenience of description, description of duplicated configurations will be omitted, and different configurations will be described.

FIG. 12 is a view illustrating a first modification of the first embodiment of the present invention.

Referring to FIG. 12, unlike the display device 100 according to the first embodiment, a display device 100a according to the first modification may not include the light source 190 and the light recycling sheet 192.

That is, in the display device 100a according to the first modification, a control electrode layer, an insulation film, a contact electrode layer, and a shuttering driving body may be formed on a first substrate 110.

At this time, the first substrate 110 may be made of a light-transmitting material.

Accordingly, the display device 100a according to the first modification may display an image on the second substrate 170 side by using an ambient light beam transmitted through the first substrate 110.

FIG. 13 is a view illustrating a second modification of the first embodiment of the present invention.

Referring to FIG. 13, a display device 100b according to a second modification may include a configuration that performs the same function as the light recycling sheet 192 of the display device 100 according to the first embodiment and has a different form.

That is, the display device 100b according to the second modification may include a light recycling electrode 195 and a flattening film 196 on the light recycling electrode 195.

The light recycling electrode 195 may be formed on the first substrate 110.

The light recycling electrode 195 may be made of metal that reflects light.

The light recycling electrode 195 may be spaced in a width direction such that the light beam can be transmitted to the second control electrode 120b.

The flattening film 196 can cover and flatten the light recycling electrode 195.

A control electrode layer, an insulation film, a contact electrode layer, and a shuttering driving body may be provided on the flattening film 196.

FIG. 14 is a view illustrating a third modification of the first embodiment of the present invention.

Referring to FIG. 14, in a display device 100c according to a third modification, the first control electrode 120a and the first contact electrode 130a can perform a function of the light recycling sheet 192 of the display device 100 according to the first embodiment.

That is, although it is assumed that the first control electrode 120a of the display device 100 according to the first embodiment is a transparent electrode, the first control electrode 120a of the display device 100c according to the third modification may be a reflective electrode.

For example, the first control electrode 120a may include at least one of Cu, Au, Ni, Ti, and Cr.

The first contact electrode 130a of the display device 100c according to the third modification may be also a reflective electrode.

Unlike this, the second control electrode 120b and the second contact electrode 130b that at least partially overlap the light emission opening 182 and the light transmission opening 194 may be transparent electrodes.

Accordingly, in the display device 100c according to the third modification, since a light recycling effect can be provided even without the light recycling sheet 192, a simpler structure can be provided.

FIG. 15 is a view illustrating a fourth modification of the first embodiment of the present invention.

Referring to FIG. 15, a display device 100d according to a fourth modification may further include a reflective sheet 198 in the display device 100b according to the second modification.

The reflective sheet 198 may be provided between the first substrate 110 and the light source 190.

By the reflective sheet 198, the light beam reflected by the light recycling electrode 195 can be re-reflected by the upper surface of the reflective sheet 198, and can be provided toward the second control electrode 120b.

That is, the reflective sheet 198 can reduce a light reflection path, thereby improving light efficiency.

FIG. 16 is a view illustrating a fifth modification of the first embodiment of the present invention.

Referring to FIG. 16, a display device 100e according to a fifth modification may further include a light-selective transmission layer 199 in the display device 100a according to the first modification.

The light-selective transmission layer 199 can function to transmit a light beam having a threshold light amount or more and block a light beam having a light amount that is less than the threshold light amount.

The shuttering driving body 160 is located at a position where the light beam is blocked. However, when there is a light beam LL that is input to the quantum dot film 175 by bypassing the shuttering driving body 160 due to repeated reflection, a light leakage phenomenon may be caused. Thus, the function of the light-selective transmission layer 199 is to prevent this phenomenon.

That is, since the light beam LL unintentionally leaking has a weak intensity generally, the light-selective transmission layer 199 prevents the light leakage phenomenon.

Hereinabove, the modifications of the first embodiment of the present invention have been described with reference to FIGS. 12 to 16.

In description of the modifications, for convenience of description, the modifications have been described individually. However, it is apparent that the first embodiment and the modifications can be implemented in combination with each other.

For example, the reflective sheet of the fourth modification can be applied even to the first embodiment, the first modification, the third modification, and the fifth modification as well as the second modification.

Hereinafter, a display device according to a second embodiment of the present invention will be described with reference to FIGS. 17 to 29.

Hereinabove, the same configuration as the configuration described in the description of FIGS. 1 to 16 is designated by the same reference numeral. Therefore, description of duplicated configurations will be omitted, and different configurations will be described.

FIG. 17 is a view illustrating a structure of a display device 200 according to a second embodiment of the present invention.

There is a difference in that in the case of the display device 100 according to the first embodiment, the control electrode layer, the insulation film, the contact electrode layer, the quantum dot film, and the light absorbing layer are formed on separate substrates. However, in the case of the display device 200 according to the second embodiment, the control electrode layer, the insulation film, the contact electrode layer, the quantum dot film, and the light absorbing layer may be formed on the same substrate, for example, the second substrate 170.

That is, the display device 200 according to the second embodiment may provide a color filter on array (COA) structure.

Since functions and operating methods of the other configurations are the same as those described above, detailed description thereof will be omitted.

FIGS. 18 to 25 are views illustrating a method of manufacturing a display device according to the second embodiment of the present invention.

Referring to FIG. 18, the second substrate 170 may be provided.

Referring to FIG. 19, the quantum dot film 175 may be provided on the second substrate 170.

As illustrated in FIG. 19, the quantum dot film 175 may have an RGBW pixel structure.

Referring to FIG. 20, the light absorbing layer 180 in which the light emission opening 182 is formed on the quantum dot film 175 may be provided.

Referring to FIG. 21, the control electrode layer including the control electrode 120 and the first and second control lines 125*a* and 125*b* may be formed on the light absorbing layer 180.

As described above, the first and second control electrodes 120*a* and 120*b* may be spaced apart from each other, and may have triangular shapes in which vertexes face each other.

The insulation film 115 may be formed on the control electrode layer.

Referring to FIG. 22, the contact electrode layer including the contact electrode 130 ad the first and second contact lines 135*a* and 135*b* may be formed on the insulation film 115.

As described above, the first and second contact electrodes 130*a* and 130*b* may be spaced apart from each other, and may have triangular shapes in which vertexes face each other.

Referring to FIG. 23, the partition wall 150 that defines the movement path of the shuttering driving body 160 may be formed on the contact electrode layer. Referring to FIG. 24, the shuttering driving body 160 may be provided in the movement path provided by the partition wall 150, and the light source 190 and the light recycling sheet 192 may be provided.

Accordingly, the display device 200 according to the second embodiment of the present invention can be provided.

Accordingly, as illustrated in FIG. 25, the light beam collected by the light recycling sheet 192 can be provided, and the amount of the light beam transmitted through each pixel can be controlled according to the average moving speed and the position of the shuttering driving body 160.

The wavelength of the light beam transmitted through the shuttering driving body 160 can be adjusted to the wavelength of a required color by the quantum dot film 175, and the light beam can be provided to the viewing surface.

Meanwhile, it is assumed that the light recycling sheet 192 is provided on the first substrate. However, unlike this, it is apparent that the light recycling sheet 192 may be provided on the second substrate, for example, between the light absorbing layer 180 and the control electrode layer.

Hereinabove, the structure and the manufacturing method of the display device according to the second embodiment of the present invention have been described with reference to FIGS. 17 to 25.

Hereinafter, modifications of the second embodiment of the present invention will be described with reference to FIGS. 26 and 29.

For convenience of description, description of duplicated configurations will be omitted, and different configurations will be described.

FIG. 26 is a view illustrating a first modification of the second embodiment of the present invention.

Referring to FIG. 26, a display device 200*a* according to a first modification of the second embodiment of the present invention corresponds to the display device 100*a* according to the first modification of the first embodiment of the present invention.

That is, the display device 200*a* according to the first modification of the second embodiment of the present invention may not include the light source 190 and the light recycling sheet 192.

Thus, the control electrode layer, the insulation film, the contact electrode layer, and the shuttering driving body may be formed on the first substrate 110.

Accordingly, the display device 200*a* according to the first modification of the second embodiment may display an image on the second substrate 170 side by using an ambient light beam transmitted through the first substrate 110.

FIG. 27 is a view illustrating a second modification of the second embodiment of the present invention.

Referring to FIG. 27, a display device 200*b* according to the second modification of the second embodiment of the present invention corresponds to the display device 100*b* according to the second modification of the first embodiment of the present invention.

That is, the display device 200*b* according to the second modification of the second embodiment may include a configuration that performs the same function as the light recycling sheet 192 and has a different form.

The display device 200*b* according to the second modification of the second embodiment may include the light recycling electrode 195 and the flattening film 196 on the light recycling electrode 195.

The light recycling electrode 195 may be formed on the second substrate 170.

The light recycling electrode 195 may be made of metal that reflects light.

The light recycling electrode 195 may be spaced such that the light beam can be transmitted to the second control electrode 120*b*.

The flattening film 196 can cover and flatten the light recycling electrode 195.

The control electrode layer, the insulation film, the contact electrode layer, and the shuttering driving body may be provided on the flattening film 196.

FIG. 28 is a view illustrating a third modification of the second embodiment of the present invention.

Referring to FIG. 28, a display device 200c according to the third modification of the second embodiment of the present invention corresponds to the display device 100d according to the fourth modification of the first embodiment of the present invention.

The display device 200c according to the third modification of the second embodiment may further include the reflective sheet 198 in the second modification of the second embodiment.

The reflective sheet 198 may be provided between the first substrate 110 and the light source 190.

By the reflective sheet 198, the light beam reflected by the light recycling electrode 195 can be re-reflected by the upper surface of the reflective sheet 198, and can be provided toward the second control electrode 120b.

That is, the reflective sheet 198 can reduce a light reflection path, thereby improving light efficiency.

FIG. 29 is a view illustrating a fourth modification of the second embodiment of the present invention.

Referring to FIG. 29, a display device 200d according to the fourth modification of the second embodiment of the present invention corresponds to the display device 100e according to the fifth modification of the first embodiment of the present invention.

That is, the display device 200d according to the fourth modification of the second embodiment may further include the light-selective transmission layer 199 in the display device 200a according to the first modification of the second embodiment.

Accordingly, in the display device 200d according to the fourth modification of the second embodiment, the light leakage phenomenon can be minimized.

Hereinabove, the modifications of the second embodiment of the present invention have been described with reference to FIGS. 26 to 29.

In description of the modifications, for convenience of description, the modifications have been described individually. However, it is apparent that the second embodiment and the modifications thereof can be implemented in combination with each other.

For example, the reflective sheet according to the third modification can be applied even to the second embodiment, and the first modification and the fourth modification of the second embodiment as well as the second modification.

Further, according to another modification of the second embodiment of the present invention, to correspond to the third modification of the first embodiment, the first control electrode 120a and the first contact electrode 130a can perform the function of the light recycling sheet 192.

To this end, the first contact electrode 130a may be a reflective electrode. Further, the first control electrode 120a may be a reflective electrode.

Accordingly, since the light recycling effect can be provided even without the light recycling sheet 192, a simpler structure can be provided.

Hereinabove, the second embodiment of the present invention and the modifications thereof have been described with reference to FIGS. 17 to 29.

Meanwhile, in the embodiments and the modifications thereof described with reference to FIGS. 1 to 29, the transmission type in which an image is provided through the second substrate has been described. However, it is apparent that the technical spirit of the present invention can be applied even to a reflective type.

Hereinafter, a display device according to a third embodiment of the present invention will be described with reference to FIG. 30.

FIG. 30 is a view illustrating a structure of a display device according to a third embodiment.

Referring to FIG. 30, a display device 300 according to a third embodiment may include a light-reflective layer 172 and may further include a light-absorbing layer 184 in the structure of the display device 100a according to the first modification of the first embodiment of the present invention.

The light-reflective layer 172 can reflect the light beam transmitted through the quantum dot film 175 toward the first substrate 110.

To this end, the light-reflective layer 172 may be made of a material having high reflectivity.

Further, the light-reflective layer 172 may be provided between the second substrate 170 and the quantum dot film 175.

The light absorbing layer 184 may be provided between the control electrode layer and the first substrate 110 to block the light beam such that the reflected light beam is emitted into individual pixel regions.

According to the third embodiment of the present invention, an external light beam, for example, an ambient light beam L1 may reach the control electrode layer, the insulation film, the contact electrode layer, and the shuttering driving body through the first substrate 110.

At this time, since the shuttering driving body is located at a position where the light beam is blocked, the ambient light beam L1 can no longer proceed and can be blocked.

Unlike this, ambient light beams L2 and L3 sequentially pass through the control electrode layer, the insulation film, the contact electrode layer, and the shuttering driving body through the first substrate 110, pass through the opening 182 of the light absorbing layer 180, and then pass through the quantum dot film 175. Thus, the ambient light beams L2 and L3 may have the wavelength of a required color.

Thereafter, the ambient light beams L2 and L3 may be reflected by the light-reflective layer 172, and may be finally emitted through the first substrate 110.

According to the third embodiment of the present invention, since the light beam passes through the quantum dot film twice, color accuracy can be further improved.

Hereinabove, the display devices according to the first to third embodiments of the present invention and the modifications thereof have been described with reference to FIGS. 1 to 30.

According to the present invention, it is possible to block the light beam and control the amount of the transmitted light beam according to the moving speed and the position of the shuttering driving body, so that a desired image can be provided without a separate polarizing layer.

Accordingly, light absorption loss of the polarizing layer can be removed in an optical viewpoint, and a process of aligning an optical axis of the polarizing layer can be omitted in a process viewpoint, so that a yield rate can be improved.

Furthermore, since the light recycling sheet can maximize the amount of the light beam provided to the shuttering driving body, brightness can be improved.

Further, since the wavelength of a color of the light beam passing through the quantum dot film is adjusted, and the light beam has a wide light emission angle, an excellent color sense can be provided.

Although the present invention has been described above in detail with reference to exemplary embodiments of the present invention, the scope of the present invention is not limited to specific embodiments, but should be construed based on the appended claims.

Further, it is understood by those skilled in the art that various modifications and changes can be made without departing from the scope of the present invention.

The invention claimed is:

1. A display device comprising:
a first substrate to which an external light beam is provided;
a first control electrode and a second control electrode spaced apart from the first control electrode, the first and second control electrodes being provided on the first substrate;
an insulation film provided on the first and second control electrodes;
a first contact electrode at least partially overlapping the first control electrode and a second contact electrode spaced apart from the first contact electrode and at least partially overlapping the second control electrode, the first and second contact electrodes being formed on the insulation film;
a shuttering driving body moving between the first contact electrode and the second contact electrode to transmit or block a light beam;
a second substrate opposite to the first substrate; and
a quantum dot film provided on the first substrate or the second substrate to adjust a wavelength of the light beam transmitted through the shuttering driving body,
wherein a light absorbing layer in which a light emission opening is formed to emit a light beam corresponding to an individual pixel is provided in the quantum dot film, and
a size of the shuttering driving body is larger than a size of the light emission opening and is smaller than a separation distance between the first contact electrode and the second contact electrode.

2. The display device of claim 1, wherein
the first control electrode and the second control electrode are provided at each pixel,
the display device further comprises a first control line electrically connecting the first control electrodes provided at the pixels and a second control line electrically connecting the second control electrodes provided at the pixels and formed in parallel to the first control line,
the first contact electrode and the second contact electrode are provided at each pixel,
the display device further comprises a first contact line electrically connecting the first contact electrodes provided at the pixels and a second contact line electrically connecting the second contact electrodes provided at the pixels and formed in parallel to the first contact line, and
the first control line and the second control line are formed in directions that are different from the first contact line and the second contact line.

3. The display device of claim 2, wherein
the first control electrode and the first contact electrode overlap each other,
the second control electrode and the second contact electrode overlap each other,
the first control electrode and the second control electrode have polygonal shapes in which vertexes face each other, and
the first contact electrode and the second contact electrode also have polygonal shapes in which vertexes face each other.

4. The display device of claim 1, further comprising:
a partition wall that partitions individual pixels, wherein the partition wall covers at least parts of the first contact electrode included in one pixel and the second contact electrode adjacent to the one pixel.

5. The display device of claim 1, further comprising:
a light recycling electrode formed in a layer different from a layer formed by the first and second control electrodes and configured to reflect a light beam provided from an outside.

6. The display device of claim 5, further comprising:
a reflective sheet configured to re-reflect the light beam reflected by the light recycling electrode.

7. The display device of claim 1, further comprising:
a light source; and
a light recycling sheet configured to reflect a light beam emitted from the light source in a direction of the light source.

8. The display device of claim 7, further comprising:
a reflective sheet configured to re-reflect the light beam reflected in a direction of the light source.

9. The display device of claim 7, wherein
a light absorbing layer in which a light emission opening is formed to emit a light beam corresponding to an individual pixel is provided on the quantum dot film, and
a light transmission opening corresponding to the light emission opening is provided on the light recycling sheet.

10. The display device of claim 1, further comprising:
a light absorbing layer formed on one side of the quantum dot film, a light emission opening being formed in the light absorbing layer to emit the light beam corresponding to an individual pixel, wherein
the first control electrode and the first contact electrode do not overlap the light emission opening, and the second control electrode and the second contact electrode overlap the light emission opening, and
the first control electrode has a property of reflecting a light beam, and the second control electrode has a property of transmitting a light beam.

11. The display device of claim 10, further comprising:
a reflective sheet configured to re-reflect the light beam reflected by the first control electrode.

12. The display device of claim 1, further comprising:
a light-selective transmission layer provided on one surface of the quantum dot film, configured to transmit the light beam when a light beam having a light amount that is equal to or more than a threshold light amount is provided, and configured to block the light beam when a light beam having a light amount that is less than the threshold light amount is provided.

13. A display device comprising:
a first substrate to which an external light beam is provided;
a second substrate opposite to the first substrate;
a quantum dot film provided on the second substrate to adjust a wavelength of a light beam transmitted through a shuttering driving body;

a first control electrode and a second control electrode spaced apart from the first control electrode, the first and second control electrodes being provided on the second substrate;
an insulation film covering the first and second control electrodes;
a first contact electrode at least partially overlapping the first control electrode and a second contact electrode spaced apart from the first contact electrode and at least partially overlapping the second control electrode, the first and second contact electrodes being formed on the insulation film; and
a shuttering driving body moving between the first contact electrode and the second contact electrode to transmit or block the light beam,
wherein a light absorbing layer in which a light emission opening is formed to emit a light beam corresponding to an individual pixel is provided in the quantum dot film, and
a size of the shuttering driving body is larger than a size of the light emission opening and is smaller than a separation distance between the first contact electrode and the second contact electrode.

14. The display device of claim 13, further comprising:
a light source provided on one side of the first substrate; and
a light recycling layer or a light recycling electrode provided on the second substrate to reflect a light beam emitted from the light source in a direction of the light source.

15. A display device comprising:
a first substrate to which an external light beam is provided;
a first control electrode and a second control electrode spaced apart from the first control electrode, the first and second control electrodes being provided on the first substrate;
an insulation film provided on the first and second control electrodes;
a first contact electrode at least partially overlapping the first control electrode and a second contact electrode spaced apart from the first contact electrode and at least partially overlapping the second control electrode, the first and second contact electrodes being formed on the insulation film;
a shuttering driving body moving between the first contact electrode and the second contact electrode to transmit and block a light beam;
a second substrate opposite to the first substrate;
a quantum dot film provided on the first substrate or the second substrate to adjust a wavelength of a light beam transmitted through the shuttering driving body; and
a light-reflective layer configured to reflect the light beam transmitted through the quantum dot film in a direction of the first substrate,
wherein alight absorbing layer in which alight emission opening is formed to emit a light beam corresponding to an individual pixel is provided in the quantum dot film, and
a size of the shuttering driving body is larger than a size of the light emission opening and is smaller than a separation distance between the first contact electrode and the second contact electrode.

16. The display device of claim 15, further comprising:
a light absorbing layer formed between the first substrate and a layer in which the first and second control electrodes are provided.

17. A display device comprising:
a first substrate to which an external light beam is provided;
a shuttering driving body moving within a predetermined distance and configured to transmit or block a light beam;
an electrode configured to provide a driving force to the shuttering driving body;
a second substrate opposite to the first substrate;
a quantum dot film provided on the first substrate or the second substrate to adjust a wavelength of the light beam transmitted through the shuttering driving body;
a light source;
a light recycling sheet configured to reflect a light beam emitted from the light source in a direction of the light source, and
a reflective sheet configured to re-reflect the light beam reflected in a direction of the light source,
wherein a light absorbing layer in which a light emission opening is formed to emit a light beam corresponding to an individual pixel is provided on the quantum dot film, and
a light transmission opening corresponding to the light emission opening is provided on the light recycling sheet.

18. A display device comprising:
a first substrate to which an external light beam is provided;
a first control electrode and a second control electrode spaced apart from the first control electrode, the first and second control electrodes being provided on the first substrate;
an insulation film provided on the first and second control electrodes;
a first contact electrode at least partially overlapping the first control electrode and a second contact electrode spaced apart from the first contact electrode and at least partially overlapping the second control electrode, the first and second contact electrodes being formed on the insulation film;
a shuttering driving body moving between the first contact electrode and the second contact electrode to transmit or block a light beam;
a second substrate opposite to the first substrate;
a quantum dot film provided on the first substrate or the second substrate to adjust a wavelength of the light beam transmitted through the shuttering driving body; and
a partition wall that partitions individual pixels,
wherein the partition wall covers at least parts of the first contact electrode included in one pixel and the second contact electrode adjacent to the one pixel.

19. A display device comprising:
a first substrate to which an external light beam is provided;
a second substrate opposite to the first substrate;
a quantum dot film provided on the second substrate to adjust a wavelength of a light beam transmitted through a shuttering driving body;
a first control electrode and a second control electrode spaced apart from the first control electrode, the first and second control electrodes being provided on the second substrate;
an insulation film covering the first and second control electrodes;
a first contact electrode at least partially overlapping the first control electrode and a second contact electrode spaced apart from the first contact electrode and at least partially overlapping the second control electrode, the first and second contact electrodes being formed on the insulation film;

a shuttering driving body moving between the first contact electrode and the second contact electrode to transmit or block the light beam; and a partition wall that partitions individual pixels, wherein the partition wall covers at least parts of the first contact electrode included in one pixel and the second contact electrode adjacent to the one pixel.

20. A display device comprising:

a first substrate to which an external light beam is provided;

a first control electrode and a second control electrode spaced apart from the first control electrode, the first and second control electrodes being provided on the first substrate;

an insulation film provided on the first and second control electrodes;

a first contact electrode at least partially overlapping the first control electrode and a second contact electrode spaced apart from the first contact electrode and at least partially overlapping the second control electrode, the first and second contact electrodes being formed on the insulation film;

a shuttering driving body moving between the first contact electrode and the second contact electrode to transmit and block a light beam;

a second substrate opposite to the first substrate;

a quantum dot film provided on the first substrate or the second substrate to adjust a wavelength of a light beam transmitted through the shuttering driving body;

a light-reflective layer configured to reflect the light beam transmitted through the quantum dot film in a direction of the first substrate; and a partition wall that partitions individual pixels, wherein the partition wall covers at least parts of the first contact electrode included in one pixel and the second contact electrode adjacent to the one pixel.

* * * * *